US011454700B1

(12) United States Patent
DeSalvo et al.

(10) Patent No.: US 11,454,700 B1
(45) Date of Patent: Sep. 27, 2022

(54) APPARATUS, SYSTEM, AND METHOD FOR MITIGATING SYSTEMATIC DISTANCE ERRORS IN RADAR-BASED TRIANGULATION CALCULATIONS

(71) Applicant: Meta Platforms Technologies, LLC, Menlo Park, CA (US)

(72) Inventors: Riccardo DeSalvo, Pasadena, CA (US); Giuseppe Castaldi, Apice (IT); Andrea Cusano, Caserta (IT); Vincenzo Galdi, Benevento (IT); Paolo Mattera, Benevento (IT); Roberto Parente, Cerreto Sanita (IT); Fereydoun Daneshgaran, La Crescenta, CA (US); Joseph Minh Tien, Alhambra, CA (US); Dustin Jeffery Gordon Krogstad, Chino, CA (US); Omar Mikhail Ilagan Perez, Gardena, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 258 days.

(21) Appl. No.: 16/836,663

(22) Filed: Mar. 31, 2020

Related U.S. Application Data

(60) Provisional application No. 62/908,927, filed on Oct. 1, 2019.

(51) Int. Cl.
*G01S 7/40* (2006.01)
*G01S 13/76* (2006.01)
*G01S 13/10* (2006.01)

(52) U.S. Cl.
CPC .......... *G01S 7/4008* (2013.01); *G01S 7/4021* (2013.01); *G01S 13/10* (2013.01); *G01S 13/767* (2013.01)

(58) Field of Classification Search
CPC ...... G01S 7/4008; G01S 7/4021; G01S 13/10; G01S 13/767
See application file for complete search history.

(56) References Cited

U.S. PATENT DOCUMENTS 5,694,132 A 12/1997 Johnson
8,035,550 B2 10/2011 Holly et al.
(Continued)

OTHER PUBLICATIONS

Bao X.Y., et al., "60-GHz AMC-Based Circularly Polarized On-Chip Antenna Using Standard 0.18-μm CMOS Technology," IEEE Transactions on Antennas and Propagation, May 2012, vol. 60 (5), pp. 2234-2241.
(Continued)

*Primary Examiner* — Timothy X Pham
(74) *Attorney, Agent, or Firm* — FisherBroyles, LLP

(57) ABSTRACT

A radar system may include (1) a wearable device, (2) a set of radar devices secured to the wearable device, wherein the set of radar devices (A) transmit radar signals to at least one transponder and (B) receive the radar signals, (3) an error-mitigation device secured to the wearable device, wherein the error-mitigation device provides data for mitigating position errors in triangulation calculations involving the radar signals, and (4) at least one processing device communicatively coupled to the set of radar devices and the error-mitigation device, wherein the processing device (A) calculates, based at least in part on roundtrip flight times of the radar signals and the data, distances between the set of radar devices and the transponder and (B) triangulates, based at least in part on the distances, a three-dimensional location of the transponder relative to the wearable device. Various other apparatuses, systems, and methods are also disclosed.

20 Claims, 11 Drawing Sheets

(56) References Cited

U.S. PATENT DOCUMENTS

| | | | |
|---|---|---|---|
| 10,013,055 | B2 | 7/2018 | Perek et al. |
| 10,451,707 | B1* | 10/2019 | Castaldi ................ G01S 5/0247 |
| 10,613,188 | B1 | 4/2020 | Castaldi et al. |
| 10,635,179 | B2 | 4/2020 | Shahmohammadi |
| 11,221,404 | B1* | 1/2022 | DeSalvo ................. G06F 3/014 |
| 2006/0025897 | A1 | 2/2006 | Shostak et al. |
| 2008/0171311 | A1 | 7/2008 | Centen et al. |
| 2009/0033538 | A1 | 2/2009 | Winkler |
| 2009/0085793 | A1* | 4/2009 | Tu ........................... G01S 13/46 342/106 |
| 2016/0363648 | A1* | 12/2016 | Mindell .................. G01S 7/003 |
| 2017/0168586 | A1 | 6/2017 | Sinha et al. |
| 2017/0173262 | A1 | 6/2017 | Veltz |
| 2018/0015327 | A1 | 1/2018 | Lee et al. |
| 2018/0074600 | A1* | 3/2018 | Park ........................ G01S 13/42 |
| 2018/0136309 | A1* | 5/2018 | Lo Monte .............. G01S 13/888 |
| 2018/0253151 | A1 | 9/2018 | Kletsov et al. |
| 2019/0018567 | A1 | 1/2019 | Murphy et al. |
| 2020/0064433 | A1* | 2/2020 | Finlay ..................... G01S 17/48 |

OTHER PUBLICATIONS

Carlowitz C., et al., "Precise Ranging and Simultaneous High Speed Data Transfer Using mm-Wave Regenerative Active Backscatter Tags," 2013 IEEE International Conference on RFID, Jun. 27, 2013, pp. 253-260.

Cheng Y-F., et al., "Reduction of Mutual Coupling Between Patch Antennas Using a Polarization-Conversion Isolator," IEEE Antennas and Wireless Propagation Letters, 2017, vol. 16, pp. 1257-1260.

Dadash M.S., et al., "A 77-GHz Active Millimeter-Wave Reflector for FMCW Radar," IEEE Radio Frequency Integrated Circuits Symposium (RFIC), Jul. 7, 2017, pp. 312-315.

Dadash M.S., et al., "Design of Low-Power Active Tags for Operation With 77-81-GHz FMCW Radar," IEEE Transactions on Microwave Theory and Techniques, Nov. 21, 2017, vol. 65 (12), pp. 5377-5388.

Jackson R.W., "A Planar Orthomode Transducer," IEEE Microwave and Wireless Components Letters, Dec. 1, 2001, vol. 11 (12), pp. 483-485.

Schmid C.M, et al., "Millimeter-Wave Phase-Modulated Backscatter Transponder for FMCW Radar Applications," IEEE MIT-S International Microwave Symposium, Aug. 4, 2011, 4 pages.

Stein W., et al., "Phase Modulated 61 GHz Backscatter Transponder for FMCW Radar-Based Ranging," IEEE RFID Virtual Journal, German Microwave Conference (GeMiC), Aachen, Germany, Mar. 10-12, 2014, 4 pages.

Wolff C., "Frequency-Modulated Continuous-Wave Radar," Radar Tutorial [online], 2018 [Retrieved on Jul. 1, 2020], pp. 1-8, Retrieved from the Internet: URL: https://www.radartutorial.eu/02.basics/ Frequency%20Modulaled%20Continuous%20Wave%20Radar.en. html .

* cited by examiner

US 11,454,700 B1

APPARATUS, SYSTEM, AND METHOD FOR MITIGATING SYSTEMATIC DISTANCE ERRORS IN RADAR-BASED TRIANGULATION CALCULATIONS

CROSS-REFERENCE TO RELATED APPLICATION

This application claims the benefit of the filing date of U.S. Provisional Application No. 62/908,927, filed Oct. 1, 2019, and entitled DEVICES, SYSTEMS, AND METHODS FOR RADAR-BASED ARTIFICIAL REALITY TRACKING, the disclosure of which is incorporated herein, in its entirety, by reference.

BRIEF DESCRIPTION OF DRAWINGS

The accompanying drawings illustrate a number of example embodiments and are a part of the specification. Together with the following description, these drawings demonstrate and explain various principles of the instant disclosure.

Figure 1:
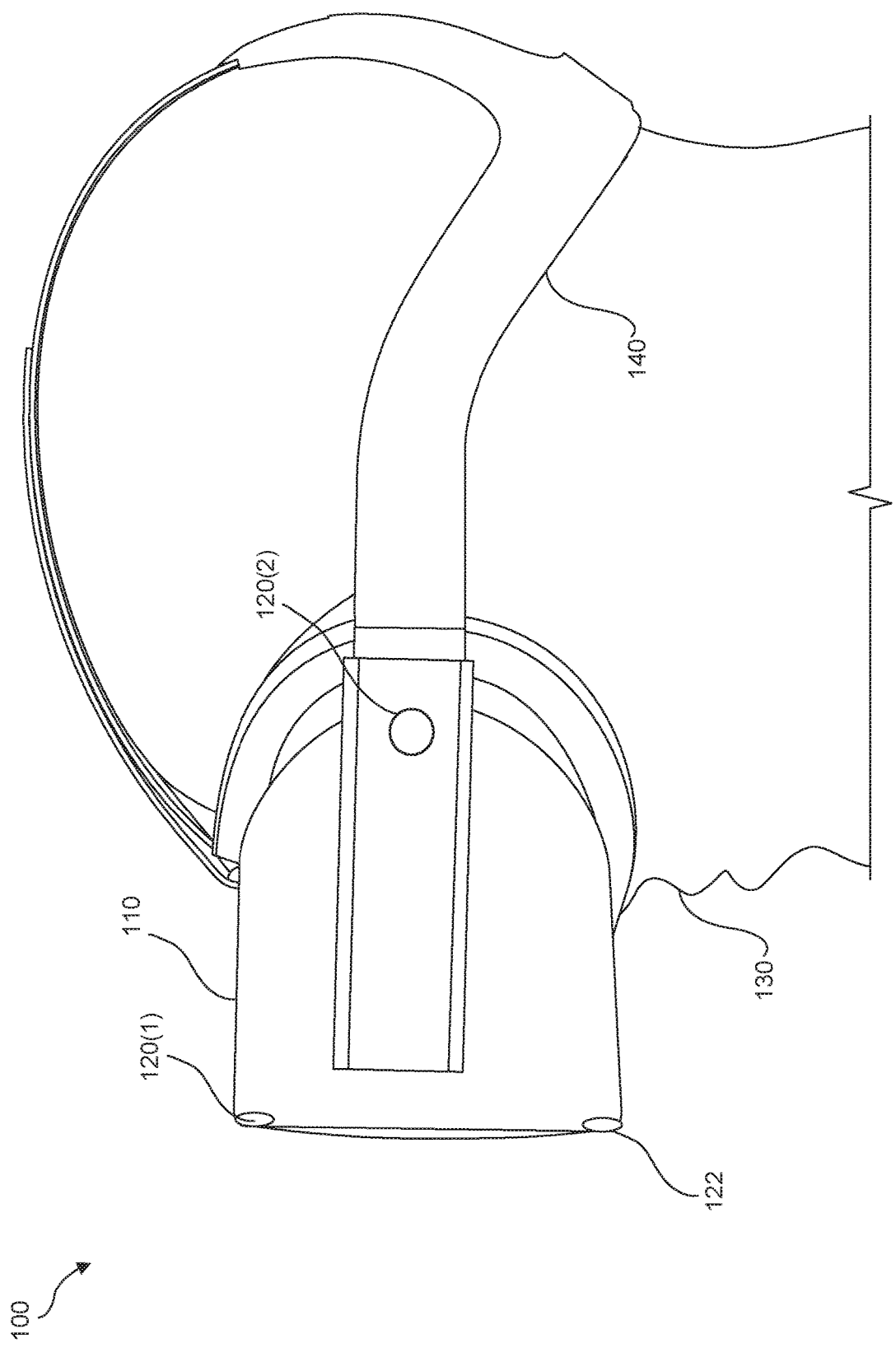
FIG. 1 is an illustration of an exemplary artificial reality system capable of mitigating systematic distance errors in radar-based triangulation calculations.

While the exemplary embodiments described herein are susceptible to various modifications and alternative forms, specific embodiments have been shown by way of example in the appendices and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

The present disclosure is generally directed to apparatuses, systems, and methods for mitigating systematic distance errors in radar-based triangulation calculations. As will be explained in greater detail below, these apparatuses, systems, and methods may provide numerous features and benefits.

Over the last several years, artificial reality systems have revolutionized the way people experience various kinds of digital media. For example, an artificial reality headset may allow users to experience realistic, immersive virtual environments while playing video games, during flight simulation training, or even when interacting with co-workers around the globe. In addition to such artificial reality applications, wearable artificial reality devices may also enable users to augment reality and/or combine certain aspects of reality with those of the virtual world.

Despite incredible advances in such technology, traditional artificial reality systems may still have certain deficiencies that negatively impact the overall user experience. For example, some traditional artificial reality systems may struggle to accurately and/or quickly determine the locations and/or positions of a user's body parts. Additionally or alternatively, some traditional artificial reality systems may struggle to accurately and/or quickly detect movements and/or changes in position made by the user's body parts. Accordingly, such artificial reality systems may be unable to update virtual content (such as graphics and/or haptic feedback) with sufficient speed and/or resolution.

To determine the locations and/or positions of users' body parts, some artificial reality systems may implement and/or deploy certain radar technologies. Unfortunately, traditional radar technologies implemented and/or deployed in artificial reality systems may suffer from and/or introduce zero-crossing deficiencies that lead to and/or cause systematic errors in the distance measurements and/or triangulation calculations. These systematic errors may be due at least in part to the radar technologies' high sensitivity to small slope variations and/or nonlinearities in the frequency ramp of the transmitter and/or emitter. The instant disclosure, therefore, identifies and addresses a need for additional apparatuses, systems, and methods for mitigating systematic distance errors in radar-based triangulation calculations.

The present disclosure is generally directed to apparatuses, systems, and methods for mitigating systematic distance errors in radar-based triangulation calculations. As will be explained in greater detail below, these apparatuses, systems, and methods may provide numerous features and benefits. For example, these apparatuses, systems, and methods may facilitate calculating, identifying, and/or tracking the position and/or movement of a certain body part of an artificial reality user in three-dimensional space. Additionally or alternatively, these apparatuses, systems, and methods may mitigate, eliminate, and/or suppress systematic errors in radar-based distance measurements used to triangulate a three-dimensional location of a transponder worn by the artificial reality user. By doing so, these apparatuses, systems, and methods may be able to increase and/or improve the accuracy or precision of the artificial reality system's radar-based localization, positioning, and/or tracking capabilities.

The following will provide, with reference to FIGS. 1-8, detailed descriptions of various apparatuses, systems, components, and/or implementations for mitigating systematic distance errors in radar-based triangulation calculations. The discussion corresponding to FIG. 9 will provide detailed descriptions of an exemplary method for mitigating systematic distance errors in radar-based triangulation calculations. The discussion corresponding to FIGS. 10 and 11 will provide detailed descriptions of types of exemplary artificial reality devices and/or systems that may facilitate and/or contribute to users' artificial reality experiences.

FIG. 1 illustrates an exemplary artificial reality system 100 that includes a wearable device 110 dimensioned and/or configured to be worn by a user 130. As illustrated in FIG. 1, wearable device 110 may include and/or incorporate a set of at least three radar devices (e.g., radar devices 120(1) and 120(2)) as well as an error-mitigation device 122. In some examples, at least one of the radar devices included in the set may be obstructed from view in FIG. 1. In one example, radar devices 120(1) and 120(2) may each include, implement, and/or represent Frequency-Modulated Continuous-Wave (FMCW) technology. Examples of radar devices 120(1) and 120(2) include, without limitation, FMCW radar devices, sinusoidal-wave radar devices, sawtooth-wave radar devices, triangle-wave radar devices, square-wave radar devices, pulse radar devices, variations or combinations of one or more of the same, and/or any other suitable radar devices.

In some examples, one or more of radar devices 120(1) and 120(2) may transmit frequency-modulated radar signals to one or more transponders located within a physical environment of user 130. Additionally or alternatively, one or more of radar devices 120(1) and 120(2) may receive and/or detect frequency-modulated radar signals returned and/or retransmitted by such transponders.

In some examples, error-mitigation device 122 may include and/or represent any type or form of device and/or component capable of generating and/or providing data (e.g., temporal, distance, and/or transmission data) for mitigating position errors in triangulation calculations involving the radar signals. In one example, error-mitigation device 122 may include and/or represent an additional radar device. For example, error-mitigation device 122 may include and/or represent a fourth radar device in addition to the three radar devices included in the set. In this example, the four radar devices may generate and/or provide four separate distance measurements that represent the respective distances between those radar devices and a transponder (not illustrated in FIG. 1).

As will be discussed in greater detail below, by generating and/or providing four distance measurements in this way, the four radar devices may enable wearable device 110 to mitigate position errors in the corresponding triangulation calculation. More specifically, as at least three distance measurements are normally needed to determine the three-dimensional location of the transponder, wearable device 110 may be able to leverage the combination of four radar-based distance measurements to determine the amount of systematic error present in those distance measurements. Stated as a general proposition, the four radar devices may generate and/or provide four equations to facilitate solving and/or determining only three unknowns. Wearable device 110 may rely on and/or leverage this redundancy of information or data to mitigate, eliminate, and/or suppress any systematic errors present in the radar-based distance measurements.

In another example, error-mitigation device 122 may include and/or represent a transponder. For example, error-mitigation device 122 may include and/or represent an internal transponder that is similar or identical to an external transponder worn on an extremity (e.g., a finger, hand, or wrist) of user 130. In this example, the internal transponder may not be intended and/or designed to receive and/or transmit any wireless signals. Instead, the internal transponder may receive a wired oscillating signal from a certain source (e.g., a transceiver) and/or transmit this wired oscillating signal back to its source. This wired oscillating signal may be delayed by a known time delay. In one embodiment, the known time delay of the internal transponder may be similar to those of the transponders being ranged.

As will be discussed in greater detail below, by receiving the delayed oscillating signal in this way, the internal transponder may enable wearable device 110 to mitigate position errors in the corresponding triangulation calculation. More specifically, as three distance measurements are normally needed to determine the three-dimensional localization of the transponder, wearable device 110 may be able to leverage the combination of three radar-based distance measurements, the delayed oscillating signal, and the known time delay to calculate and/or determine the amount of systematic error present in those distance measurements. Stated as a general proposition, the three radar devices may generate and/or provide three equations, and the internal transponder may generate and/or provide a fourth equation for analysis in conjunction with the other three equations. Accordingly, the three radar devices and the internal transponder may together generate and/or provide four equations to facilitate solving and/or determining only three unknowns. Wearable device 110 may rely on and/or leverage this redundancy of information or data to mitigate, eliminate, and/or suppress any systematic errors present in the distance measurements.

In some examples, wearable device 110 may include and/or represent a head-mounted display. In one example, the term "head-mounted display" may refer to any type or form of display device or system that is worn on or about a user's face and displays visual content to the user. Head-mounted displays may display content in any suitable way, including via a screen (e.g., an LCD or LED screen), a projector, a cathode ray tube, an optical mixer, etc. Head-mounted displays may display content in one or more media formats. For example, head-mounted displays may display video, photos, computer-generated imagery (CGI), and/or variations or combinations of one or more of the same.

Head-mounted displays may provide diverse and distinctive user experiences. Some head-mounted displays may provide virtual reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear.

As illustrated in FIG. 1, user 130 may place artificial reality system 100 on the user's head such that wearable device 110 is positioned and/or rests on the user's face. By placing wearable device 110 on his or her face in this way, user 130 may situate a head-mounted display over his or her eyes to experience and/or view virtual content presented on the head-mounted display. User 130 may also secure the head-mounted display of wearable device 110 in the correct position by wrapping a strap 140 around the back of the user's head.

Figure 2:
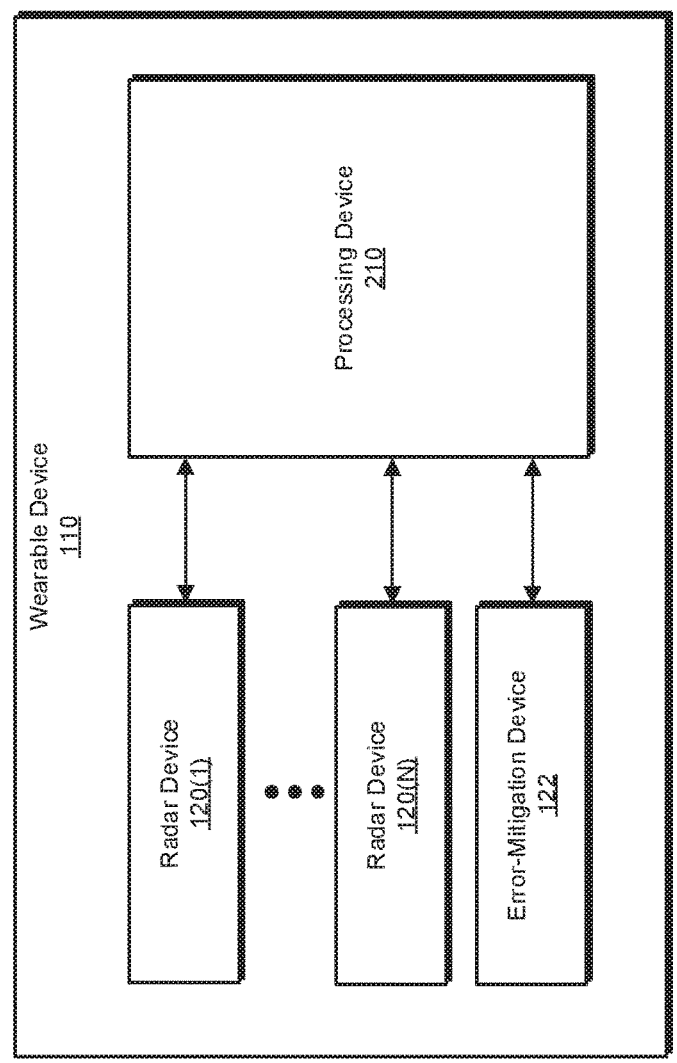
FIG. 2 is a block diagram of an exemplary wearable device capable of mitigating systematic distance errors in radar-based triangulation calculations.

FIG. 2 is a block diagram of exemplary wearable device 110 that facilitates radar-based artificial reality tracking. As illustrated in FIG. 2, wearable device 110 may include radar devices 120(1)-(N), error-mitigation device 122, and a processing device 210. In some examples, processing device 210 may be communicatively coupled to radar devices 120(1)-(N) and error-mitigation device 122. In one example, processing device 210 may include and/or represent a hardware-implemented processor capable of interpreting and/or executing computer-readable instructions. Additional examples of processing device 210 include, without limitation, microprocessors, microcontrollers, Central Processing Units (CPUs), Field-Programmable Gate Arrays (FPGAs) that implement softcore processors, Application-Specific Integrated Circuits (ASICs), radiofrequency mixers, radiocommunications circuitry, electrical circuitry, portions of one or more of the same, variations or combinations of one or more of the same, and/or any other suitable physical processor.

Figure 3:
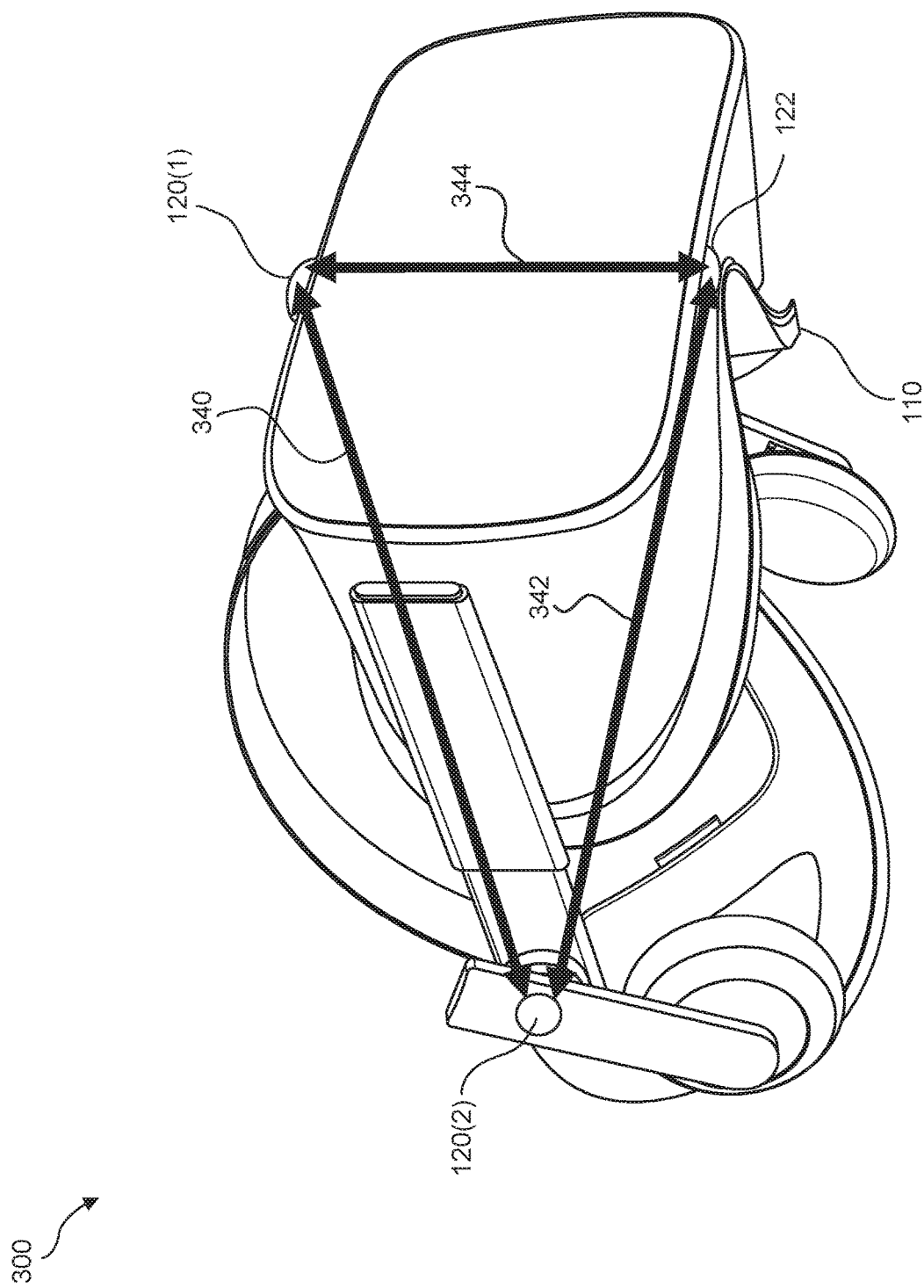
FIG. 3 is an illustration of an exemplary artificial reality system capable of mitigating systematic distance errors in radar-based triangulation calculations.

FIG. 3 illustrates an exemplary artificial reality system 300 that includes wearable device 110 dimensioned and/or configured to be worn by a user. As illustrated in FIG. 3, wearable device 110 may include and/or incorporate multiple radar devices and an error-mitigation device. For example, radar devices 120(1) and 120(2) may be secured to wearable device 110 in different positions. More specifically, radar device 120(1) may be secured atop the display of wearable device 110 at the middle of the user's forehead, and radar device 120(2) may be secured to wearable device 110 proximate to the user's right ear. Although not visible in FIG. 3, another radar device may be secured to wearable device 110 proximate to the user's left ear. In one embodiment, to improve the accuracy and/or precision of the radar-based tracking of wearable device 110, these various radar devices may be situated and/or spaced as far apart from one another in three-dimensional space as possible on wearable device 110.

As illustrated in FIG. 3, error-mitigation device 122 may be secured below the display of wearable device 110 above the user's nose. In some examples, radar devices 120(1) and 120(2) may be separated from one another by a known distance 340 on wearable device 110. In such examples, radar device 120(1) and error-mitigation device 122 may also be separated from one another by a known distance 344 on wearable device 110. Further, radar device 120(2) and error-mitigation device 122 may also be separated from one another by a known distance 342 on wearable device 110. Additionally or alternatively, radar device 120(2) and the other radar device proximate to the user's left ear may be separated from one another by a known distance on wearable device 110. As will be described in greater detail below, the known distances between these various radar devices may be used to facilitate radar-based artificial reality tracking, triangulation, three-dimensional localization, and/or systematic error mitigation.

Figure 4:
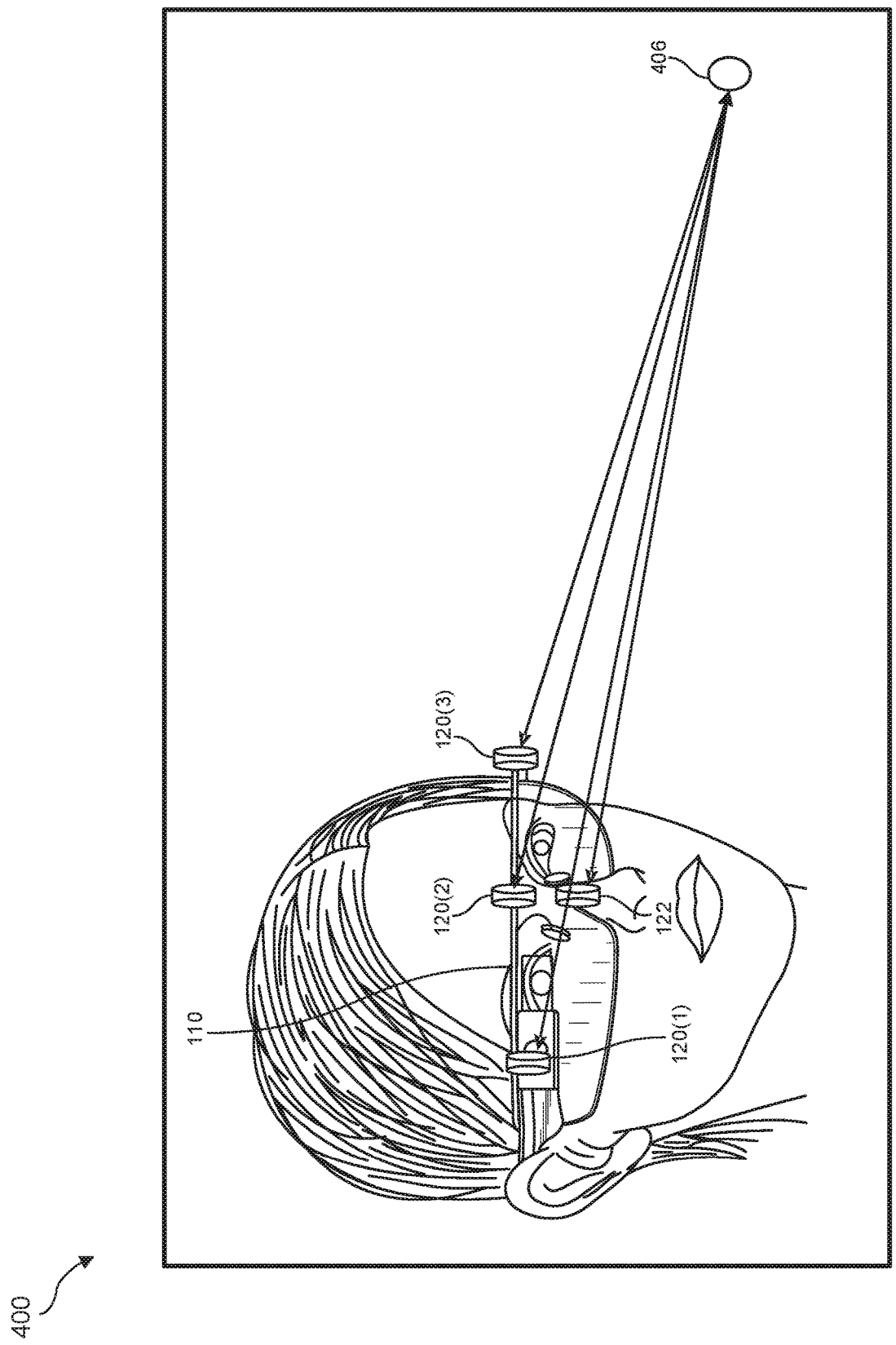
FIG. 4 is an illustration of an exemplary artificial reality system capable of mitigating systematic distance errors in radar-based triangulation calculations.

FIG. 4 illustrates an exemplary artificial reality system 300 that includes wearable device 110 by a user and a transponder 406 tracked and/or localized in three-dimensional space by wearable device 110. As illustrated in FIG. 4, wearable device 110 may include and/or incorporate radar devices 120(1), 120(2), and 120(3) as well as error-mitigation device 122. In one example, one of radar devices 120(1)-(3) may transmit a radar signal to transponder 406. In this example, all of radar devices 120(1)-(3) may then receive the radar return signal from transponder 406. In this example, error-mitigation device 122 may be a fourth radar device that receives an additional radar signal from transponder 406. Alternatively, error-mitigation device 122 may be a transponder (wired or wireless) positioned at a known fixed distance relative to the other radar receivers.

In some examples, the radar devices and/or processing device 210 of wearable device 110 may mark and/or record the time of transmission and/or reception of the radar signals. In one example, the radar devices and/or processing device 210 of wearable device 110 may identify, determine, and/or calculate the differential and/or delta between the transmission and receptions times for the radar signals. Additionally or alternatively, the radar devices and/or processing device 210 of wearable device 110 may identify, determine, and/or calculate the roundtrip flight times of the radar signals. In this context, the roundtrip flight time may refer to and/or represent the amount of time taken by a radar signal to travel from a radar device to transponder 406 and then back from the transponder to the radar device.

Continuing with this example, the radar devices and/or processing device 210 of wearable device 110 may calculate and/or determine distance measurements that represent the respective distances between the radar devices and transponder 406 based at least in part on the roundtrip flight times of the radar signals. Processing device 210 of wearable device 110 may then triangulate, based at least in part on those distance measurements, a three-dimensional location of transponder 406 relative to wearable device 110.

Figure 5:
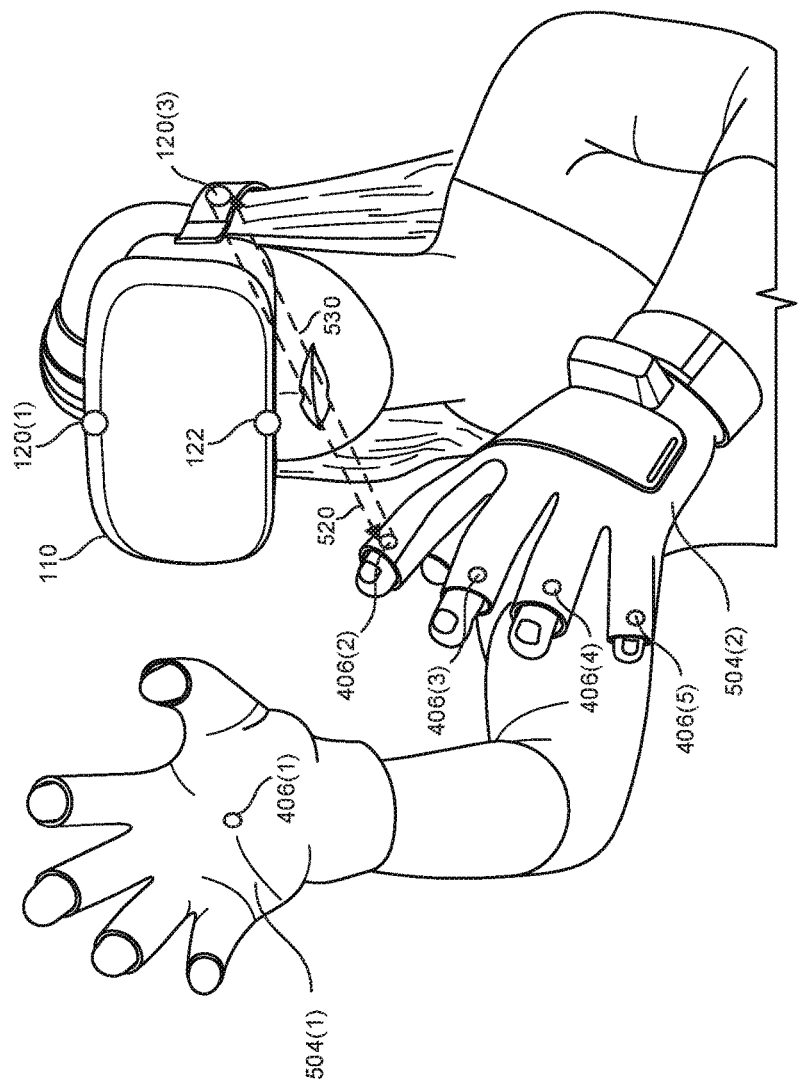
FIG. 5 is an illustration of an exemplary artificial reality system capable of mitigating systematic distance errors in radar-based triangulation calculations.

FIG. 5 illustrates an exemplary artificial reality system 500 that includes wearable device 110 and wearable accessories 504(1)-(2) worn by a user. As illustrated in FIG. 5, wearable device 110 may include and/or incorporate radar devices 120(1) and 120(3) as well as error-mitigation device 122. Wearable device 110 may also include and/or incorporate radar devices 120(2) (not visible in FIG. 5) situated proximate to the user's right ear.

In some examples, wearable accessory 504(1) may be worn by the user on his or her right hand, and wearable accessory 504(2) may be worn by the user on his or her left hand. In one example, wearable accessories 504(1) and 504(2) may each include and/or represent gloves that fit and/or partially envelope the user's hands. Additional examples of wearable accessories 504(1) and 504(2) include, without limitation, wristbands, pendants, bracelets, rings, jewelry, anklebands, clothing, electronic textiles, shoes, clips, variations or combinations of one or more of the same, and/or any other suitable wearable accessories.

As illustrated in FIG. 5, wearable accessories 504(1) and 504(2) may each include and/or incorporate one or more transponders. For example, wearable accessory 504(1) may include and/or incorporate a transponder 406(1) and any other transponders that are not visible in FIG. 5. Similarly, wearable accessory 504(2) may include and/or incorporate transponders 406(2), 406(3), 406(4), 406(5) and any other transponders that are not visible in FIG. 5.

In some examples, radar device 120(3) may transmit a frequency-modulated radar signal 520 to transponder 406(2) located proximate to the user's left index finger. In one example, frequency-modulated radar signal 520 may sweep and/or ramp across or between a certain range of frequencies. In this example, the frequency of signal 520 may vary linearly over a certain period of time. However, some imperfections in the linearity of signal 520 may exist.

In some examples, transponder 406(2) may detect and/or receive frequency-modulated radar signal 520 from radar device 120(3). Upon receiving frequency-modulated radar signal 520, transponder 406(2) may reflect, echo, return and/or otherwise retransmit the signal back to radar device 120(3). This reflected, echoed, returned, and/or retransmitted signal may be represented and/or referred to as returned signal 530 in FIG. 5 for purposes of distinction.

In some examples, transponder 406(2) may include and/or represent a repeater that simply amplifies and returns the frequency-modulated radar signal back to radar device 120(3) without modifying the signal with any form of frequency shifting. Additionally or alternatively, transponder 406(2) may actively perform frequency shifting on the frequency-modulated radar signal prior to returning the signal back to radar device 120(3). In other words, transponder 406(2) may translate signal 520 in the frequency domain by known amounts. For example, upon receiving frequency-modulated radar signal 520, transponder 406(2) may form returned signal 530 by shifting signal 520 by a certain amount of frequency via modulation. Transponder 406(2) may then transmit returned signal 530 to radar device 120(3).

In some examples, radar device 120(3) may detect and/or receive returned signal 530 from transponder 406(2). In one example, radar device 120(3) may pass and/or forward returned signal 530 to processing device 210 of wearable device 110. Upon detecting and/or receiving returned signal 530, processing device 210 may determine and/or identify the frequency of returned signal 530 and/or compensate for the frequency shifting performed by transponder 406(2). For example, processing device 210 may remove a certain frequency offset from returned signal 530. In this example, processing device 210 may then use the frequency of returned signal 530 to calculate the distance between transponder 406(2) and radar device 120(3).

In some examples, radar device 120(3) may transmit and/or broadcast frequency-modulated radar signal 520 to many or even all of transponders 406(1)-(6). In such examples, any of transponders 406(1)-(6) may function and/or operate in the same ways as transponder 406(2). For example, transponders 406(1)-(6) may each form returned signals by shifting radar signal 520 by a certain amount of frequency and then returning those shifted signals back to radar device 120(3). In this way, processing device 210 of wearable device 110 may be able to use the frequencies of those returned signals to calculate the various distances between each of transponders 406(1)-(6) and radar device 120(3). Simultaneously scanned transponders may then be distinguished from one another based on the frequency shifts they induce on the returned signal.

In some examples, any of radar devices 120(1)-(3) may function and/or operate in the same ways as radar device 120(3). For example, radar devices 120(1)-(3) may each transmit and/or broadcast a frequency-modulated radar signal to one or more of transponders 406(1)-(6). In this example, transponders 406(1)-(6) may each form returned signals by shifting the incoming radar signal by a certain amount of frequency and then returning that shifted signal back to the corresponding radar device. In this way, processing device 210 of wearable device 110 may be able to use the frequencies of such returned signals to calculate the various distances between transponders 406(1)-(6) and radar devices 120(1)-(3).

Frequency shifting may serve a variety of purposes and/or provide a variety of benefits within artificial reality system 500. As one example, frequency shifting by transponders 406(1)-(6) may expand and/or extend the detection range of radar devices 120(1)-(3) to reach the blind zone. For example, by shifting frequency-modulated radar signal 520 to form returned signal 530, transponder 406(2) may enable processing device 210 to calculate an unambiguous distance measurement between transponder 406(2) and radar device 120(3) even when transponder 406(2) is within a minimum distance threshold of radar device 120(3). In this example, the minimum distance threshold may be outside the normal detection range of radar device 120(3). In other words, radar device 120(3) may be unable to accurately measure the distance but for and/or without transponder 406(2) performing such frequency shifting when transponder 406(2) is too close to radar device 120(3).

As a specific example, the user's blind zone may include and/or represent a range between 0 and 10 centimeters from wearable device 110 and the transponder in question. The blind zone may introduce high levels of noise into the corresponding radar reading. Additionally, or alternatively, the transponder may be effectively undetectable while located within the blind zone.

As another example, frequency shifting by transponders 406(1)-(6) may enable radar devices 120(1)-(3) and/or processing device 210 to distinguish one transponder from another. For example, transponder 406(1) may be programmed and/or designed to shift the frequency of radar signal 520 by a certain offset to a first frequency band that is unique to and/or reserved for transponder 406(1). In this example, transponder 406(2) may be programmed and/or designed to shift the frequency of radar signal 520 by a certain offset to a second frequency band that is unique to and/or reserved for transponder 406(2). Accordingly, the first and second frequency bands may be mutually exclusive. Thus, processing device 210 may be able to distinguish between transponders 406(1) and 406(2) because, in this example, the first and second frequency bands are mutually exclusive. Additionally or alternatively, by frequency shifting radar signal 520 to form returned signal 530, transponder 406(2) may select a frequency band with significantly less noise and/or clutter due to the environment, thereby improving the radar devices' performance, accuracy, and/or precision.

In certain examples, some of transponders 406(1)-(6) may operate on separate and/or different communication channels from one another. Accordingly, such transponders may be tuned to retransmit only incoming frequency-modulated radar signals within a specific frequency range. In such examples, some of radar devices 120(1)-(3) may also operate on specific and/or different communication channels from one another. In this way, one of radar devices 120(1)-(3) may be paired to one of transponders 406(1)-(6) to the exclusion of the rest by way of the specific frequency range.

Figure 6:
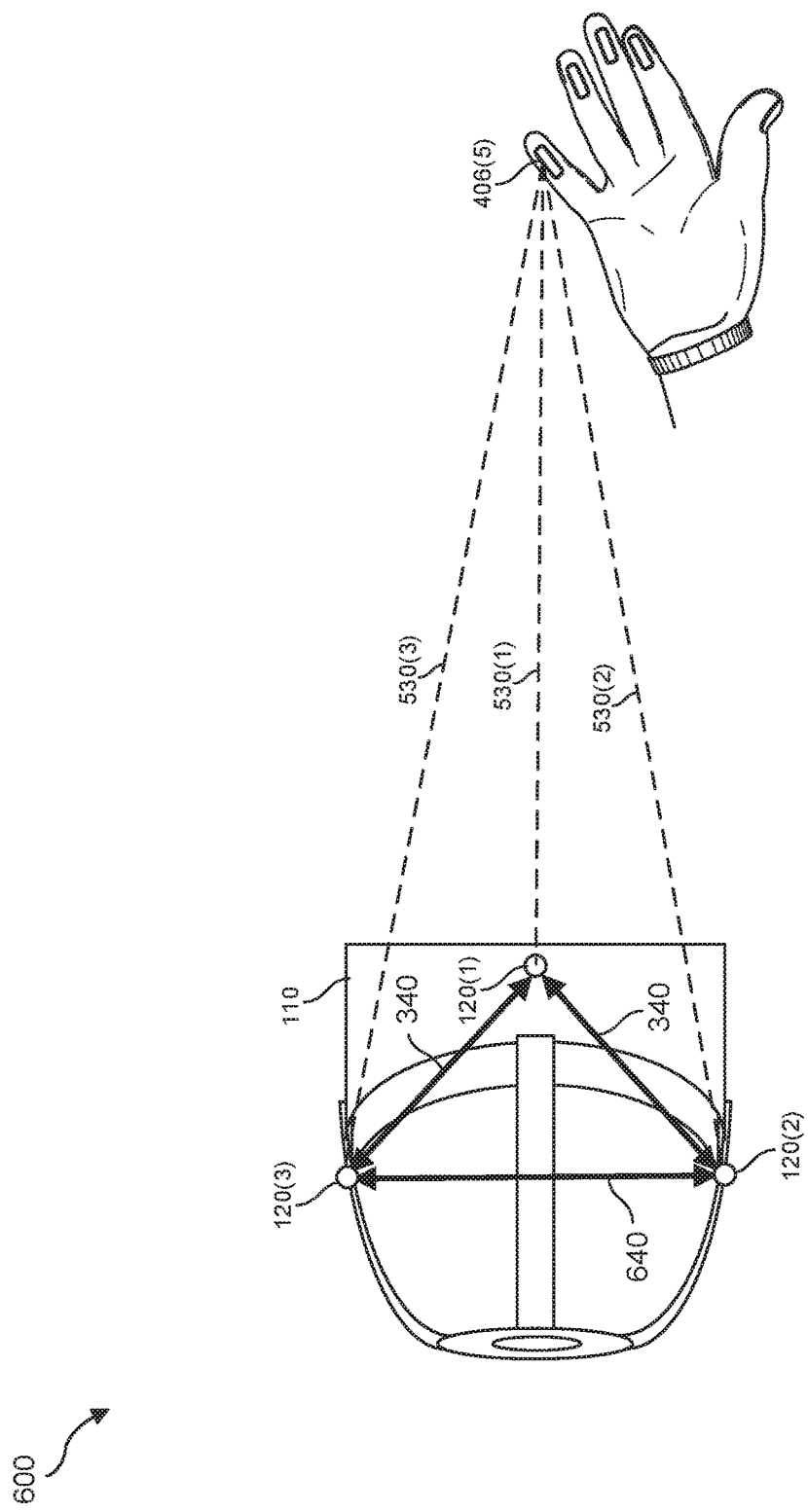
FIG. 6 is an illustration that depicts certain exemplary principles of operation of mitigating systematic distance errors in radar-based triangulation calculations.

FIG. 6 illustrates a top-down perspective of an exemplary artificial reality system 600 that includes wearable device 110 and transponder 406(5) worn by a user. As illustrated in FIG. 6, wearable device 110 may include and/or incorporate radar devices 120(1)-(3). In some examples, radar device 120(1) may be situated proximate to the user's forehead and/or the top of the user's head on wearable device 110. In such examples, radar device 120(2) may be situated proximate to the user's right ear on wearable device 110. In addition, radar device 120(3) may be situated proximate to the user's left ear on wearable device 110.

In some examples, radar device 120(1) may be separated from both of radar devices 120(2) and 120(3) by known distance 340. In addition, radar devices 120(2) and 130(3) may be separated from each other by a known distance 640. In such examples, some of radar devices 120(1)-(3) may be non-coplanar and/or non-colinear (e.g., not aligned) with one another on wearable device 110. This non-coplanarity and/or non-colinearity of some of radar devices 120(1)-(3) may enable processing device 210 of wearable device 110 to unambiguously calculate and/or determine the three-dimensional location of transponder 406(5) relative to wearable device 110 by way of triangulation and/or trigonometry.

In some examples, radar devices 120(1)-(3) may each detect and/or receive a returned signal from transponder 406(5). For example, radar device 120(1) may receive returned signal 530(1) from transponder 406(5). Similarly, radar device 120(2) may receive returned signal 530(2) from transponder 406(5). In addition, radar device 120(3) may receive returned signal 530(3) from transponder 406(5).

The three-dimensional location of transponder 406(5) may be calculated and/or determined in a variety of different ways. In some examples, processing device 210 of wearable device 110 may be able to calculate and/or determine the three-dimensional location of transponder 406(5) by way of triangulation and/or trigonometry. As a specific example, radar device 120(1) may transmit a frequency-modulated radar signal to transponder 406(5). In this example, the frequency of this radar signal may vary within the range of 120 gigahertz to 130 gigahertz over time. More specifically, this radar signal may follow a frequency model that is ideally linear with time. For example, this radar signal may sweep and/or ramp from 120 gigahertz to 130 gigahertz over 1 millisecond. Accordingly, this radar signal's frequency may change 1 gigahertz every 100 microseconds. Put another way, this radar signal may have a frequency sweep or ramp of 10 gigahertz per millisecond.

Continuing with this example, radar device 120(1) may receive returned signal 530(1) from transponder 406(5) in response to the transmitted frequency-modulated radar signal. In this example, as radar device 120(1) receives the returned signal from transponder 406(5), processing device 210 may identify the transponder from the modulation frequency of the return signal induced by the transponder. Upon processing the received signal, radar device 120(1) may pass the received signal to processing device 210, which then determines the distance from radar device 120(1) to the transponder from the sideband frequencies of the known modulation frequency of the transponder.

Although the above example involves a frequency sweep of 10-gigahertz per 1 millisecond, various other frequency sweeps may be implemented as alternatives. For example, the frequency of the radar signal may vary between any 1-gigahertz range. In one example, the selected frequency sweep may be within the range that provides the best and/or most linearity, thereby facilitating relatively simple and/or uncomplicated error mitigation in the distance readings. The ability to sweep faster may be a desirable feature for the radar system.

In some examples, the distance between transponder 406(5) and radar device 120(1) may be calculated and/or accurately estimated by multiplying the beat frequency by a range conversion factor (e.g., a speed of light approximation, the frequency sweep, additional factors or constants, and/or a variation or combination of one or more of the same). In one example, the distance between transponder 406(5) and radar device 120(1) may be calculated and/or accurately estimated by the following formula:

$$\text{distance} = \frac{\text{speed of light} \times \text{beat frequency}}{2 \times \text{frequency sweep}}.$$

This beat frequency may include and/or represent the sideband frequency around the known modulation frequency of the transponder. For instance, if the modulation frequency used by transponder 406(5) is $f_m$, the radar processed return signal in absence of noise includes and/or represents two sidebands at frequencies $f_m \mp f_b$, where $f_b$ is the beat frequency appearing in the previous formula. Other embodiments of such a formula may account for certain real-world offsets, compensations, and/or processing delays that potentially affect the travel time of the transmission and/or returned signals. Processing device 210 may calculate and/or accurately estimate the distance between transponder 406(5) and radar device 120(1) by applying the beat frequency of returned signal 530(1) to that formula (e.g., $$\text{distance} = \frac{\left(1.18 \times 10^{10} \frac{\text{inches}}{\text{second}}\right) \times (61{,}020 \text{ hertz})}{2 \times \left(1 \times 10^{13} \frac{\text{hertz}}{\text{second}}\right)} \approx 36 \text{ inches}).$$

In this example, the distances between transponder 406(5) and radar devices 120(2) and 120(3) may be calculated and/or accurately estimated in the same way. For example, processing device 210 may calculate the beat frequency of returned signal 530(2) as 67,800 hertz and the beat frequency of returned signal 530(3) as 69,495 hertz. Accordingly, processing device 210 may calculate and/or accurately estimate the distance between transponder 406(5) and radar device 120(2) by applying the beat frequency of returned signal 530(2) to that formula (e.g., $$\text{distance} = \frac{\left(1.18 \times 10^{10} \frac{\text{inches}}{\text{second}}\right) \times (67{,}800 \text{ hertz})}{2 \times \left(1 \times 10^{13} \frac{\text{hertz}}{\text{second}}\right)} \approx 40 \text{ inches}).$$

Similarly, processing device 210 may calculate and/or accurately estimate the distance between transponder 406(5) and radar device 120(3) by applying the beat frequency of returned signal 530(3) to that formula (e.g., $$\text{distance} = \frac{\left(1.18 \times 10^{10} \frac{\text{inches}}{\text{second}}\right) \times (69{,}495 \text{ hertz})}{2 \times \left(1 \times 10^{13} \frac{\text{hertz}}{\text{second}}\right)} \approx 41 \text{ inches}).$$

In some examples, these distances between radar devices 120(1)-(3) and transponder 406(5) may represent and/or correspond to a three-dimensional location of transponder 406(5) relative to wearable device 110. For example, processing device 210 may be able to access known distance 340 between radar devices 120(1) and 720(2), known distance 340 between radar devices 120(1) and 720(3), and/or known distance 640 between radar devices 120(2) and 720(3). With these known distances and the calculated distances between transponder 406(5) and radar devices 120(1)-(3), processing device 210 may map and/or track transponder 406(5) within and/or across three-dimensional space relative to wearable device 110.

Unfortunately, these distance measurements may not necessarily be accurate and/or true to the real distance between radar devices 120(1)-(3) and transponder 406(5). For example, radar devices 120(1)-(3) may suffer from and/or introduce zero-crossing deficiencies that lead to and/or cause systematic errors in the distance measurements and/or triangulation calculations. These systematic errors may be due at least in part to these radar devices high sensitivity to small slope variations and/or nonlinearities in the frequency sweep or ramp of their respective signals. As a result, to achieve and/or attain more accurate distance measurements, processing device 210 may modify and/or correct those distance measurements to compensate and/or account for any such errors.

Zero-crossing may represent and/or refer to any points or moments at which a sinusoidal signal changes from positive to negative or vice versa. In one example, the beat frequency of the sinusoidal signal may be measurable based at least in part on its period. For example, radar systems 120(1)-(3) may measure the time intervals between the peaks of their respective sinusoidal signals, between the valleys of their respective sinusoidal signals, or between the moments at which their respective sinusoidal signals cross the zero-amplitude marker.

As a specific example, if error-mitigation device 122 (not visible in FIG. 6) is itself a radar device, wearable device 110 may include and/or incorporate a total of four radar devices, one of which transmits a radar signal to transponder 406(5). The radar devices may then receive that radar signal in return from transponder 406(5). In this example, the radar devices may be placed and/or positioned at different locations on and/or relative to wearable device 110.

Their respective positions on wearable device 110 may be represented as $$P_{Ri} = \begin{bmatrix} x_{Ri} \\ y_{Ri} \\ z_{Ri} \end{bmatrix},$$

i=1, 2, 3, 4 (where "P" corresponds to the radar device's position, "x", "y", and "z" correspond to the respective dimensions and/or coordinates of the radar device's position, and "i" corresponds to the specific radar device). For example, the three-dimensional position of radar device 120(1) may be represented as $$P_{R120(1)} = \begin{bmatrix} x_{R120(1)} \\ y_{R120(1)} \\ z_{R120(1)} \end{bmatrix},$$

the three-dimensional position of radar device 120(2) may be represented as $$P_{R120(2)} = \begin{bmatrix} x_{R120(2)} \\ y_{R120(2)} \\ z_{R120(2)} \end{bmatrix},$$

the three-dimensional position of radar device 120(3) may be represented as $$P_{R120(3)} = \begin{bmatrix} x_{R120(3)} \\ y_{R120(3)} \\ z_{R120(3)} \end{bmatrix},$$

and the three-dimensional position of error-mitigation device 122 may be represented as $$P_{R122} = \begin{bmatrix} x_{R122} \\ r_{R122} \\ z_{R122} \end{bmatrix}.$$

When worn by the user, transponder 406(5) may move from one location and/or position to another relative to wearable device 110. In one example, this transponder's position relative to wearable device 110 may be represented as $$P_{TR} = \begin{bmatrix} x_{TR} \\ y_{TR} \\ z_{TR} \end{bmatrix}$$

(where "P" corresponds to the transponder's position and "x", "y", and "z" correspond to the respective dimensions and/or coordinates of the transponder's position).

From their respective radar signals, the four radar devices may be able to calculate and/or determine their respective distances from transponder 406(5). In one example, one of the radar devices may emit and/or transmit a frequency chirp, sweep, and/or ramp whose perturbation and/or non-linearity is represented as the error function e(t). In this example, the radar devices may measure a certain number of periods of the beat signal during the observation time represented as $[0, T_w]$, (where "0" corresponds to the start time of the observation interval and "$T_w$," corresponds to the end time of the observation interval). To mitigate the systematic error from the distance measurements, the radar devices and/or processing device 210 may fix and/or set the observation time and/or interval relative to the beginning of the frequency chirp, sweep, and/or ramp. Upon doing so, the radar devices and/or processing device 210 may measure a certain number of periods of this observation time and/or interval. In one embodiment, the radar devices and/or processing device 210 may be able to measure such periods by implementing template matching and/or matched filtering.

In one example, processing device 210 may determine and/or calculate a systematic error that affects all the distance measurements of the radar devices. In this example, the systematic error may be represented as $[e(T_w)-e(0)]=\delta$ (where "$\delta$" corresponds to the amount and/or degree of error). For example, to determine and/or calculate the systematic error, processing device 210 may solve for $\delta$ in $$\sqrt{(x_{TR}-x_{Ri})^2+(y_{TR}-y_{Ri})^2+(z_{TR}-z_{Ri})^2}+\frac{0.5c(m_i+\beta_i)}{(a_1 T_w)}\delta \cong$$

$$\frac{0.5c(m_i+\beta_i)}{a_1 T_w}, i=1, 2, 3, 4$$

(where "$m_i$" corresponds to a measurable integer representing the total number periods of the beat frequency and "$\beta_i$" corresponds to a measurable real number, and "$a_1$" corresponds to the slope (in GHz/μs) of the signal fed into the system's voltage-controlled oscillator). In this example, processing device 210 may apply, to this equation, the known values corresponding to the radar devices' position vectors and the calculated values corresponding to the transponder's position vector. By doing so, processing device 210 may solve for the "$\delta$" and thus determine and/or calculate the systematic error.

In one example, the total window of observation may be represented and/or implemented as $(m_i+\beta_i)*T_b$. In this example, if the total number of periods of the beat frequency is 2 and the actual period of the beat frequency is 1 millisecond, then the total time of all full periods within the window of observation may be represented and/or implemented as $T_m=m_1T_b=2*1$ millisecond=2 milliseconds. To obtain meaningful information from a measured window of observation, the radar devices and/or processing device 210 may need to observe at least one full period and/or measure the same. By doing so, the radar devices and/or processing device 210 may be able to measure the corresponding beat frequency.

As a specific example, if the window of observation is 2.5 milliseconds and the number of observed periods is 2 within that window, then the resulting period would be 2 milliseconds and $\beta_1$ would be 0.5. As a result, the window of observation may also include and/or represent an additional half period of the beat frequency. The best-case scenario may be to have a window of observation in which $\beta_1$ is 0 because such a window may maximize the number of observable periods.

Upon determining and/or calculating the systematic error, processing device 210 may modify and/or correct the distance measurements obtained from the radar devices and/or the transponder's position vector to compensate and/or account for the systematic error. For example, processing device 210 may subtract the value of the systematic error from the distance measurements obtained from the radar devices. In this example, processing device 210 may then triangulate the three-dimensional location of transponder 406(5) based at least in part on the corrected distance measurements.

Figure 7:
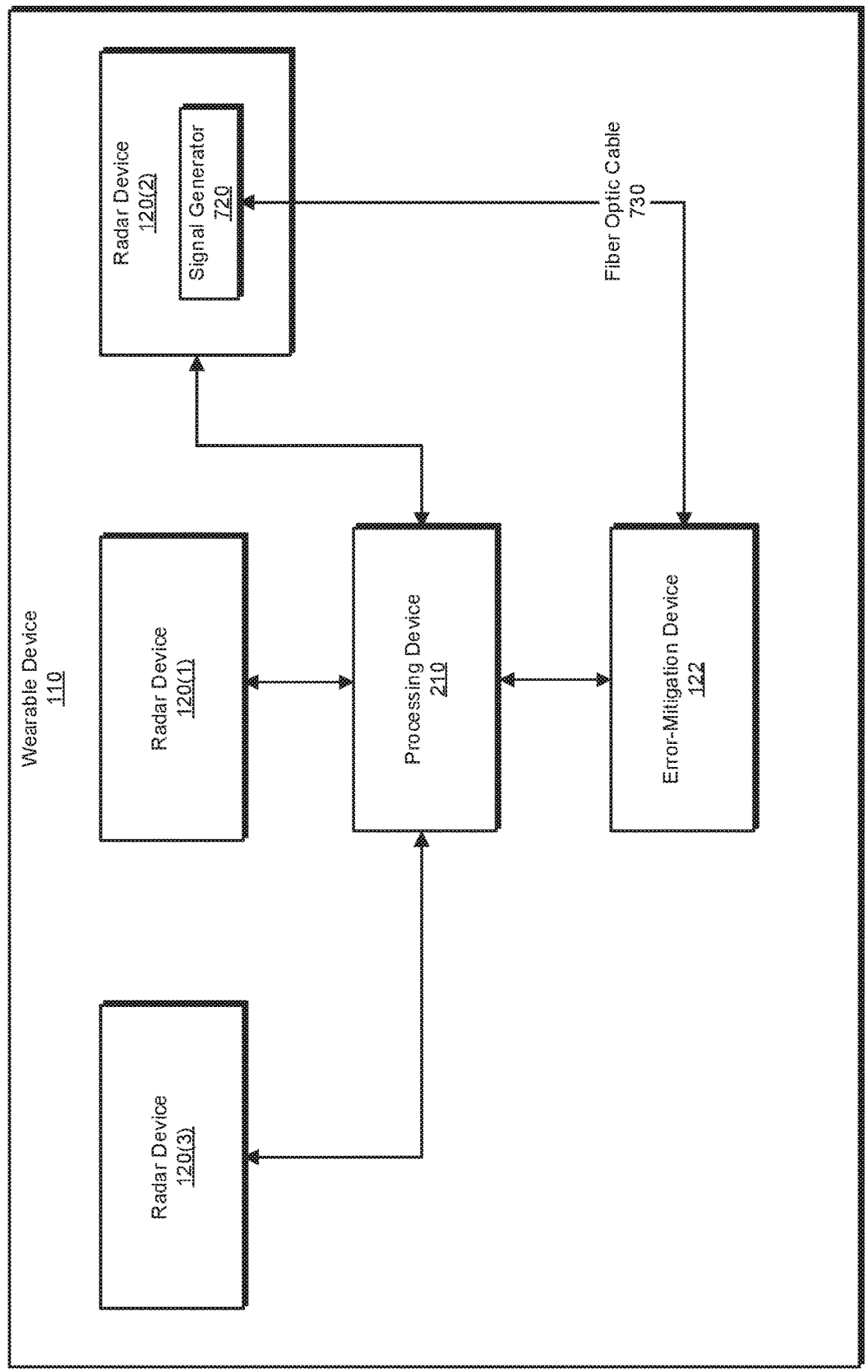
FIG. 7 is a block diagram of an exemplary wearable device that incorporates a fiber optic cable for providing a known delay to an oscillating signal traversing from a signal generator to an error-mitigation device.

As another specific example, if error-mitigation device 122 (as illustrated in FIG. 7) is an internal transponder similar or identical to transponder 406(5), wearable device 110 may include and/or incorporate a total of three radar devices, one of which transmits a radar signal to transponder 406(5). These radar devices may then receive the radar signal in return from transponder 406(5). In this example, the radar devices may be placed and/or positioned at different locations on and/or relative to wearable device 110. Their respective positions on wearable device 110 may be represented as $$P_{Ri} = \begin{bmatrix} x_{Ri} \\ y_{Ri} \\ z_{Ri} \end{bmatrix},$$

i=1, 2, 3 (where "P" corresponds to the radar device's position, "x", "y", and "z" correspond to the respective dimensions and/or coordinates of the radar device's position, and "i" corresponds to the specific radar device). Similarly, the transponder represented as error-mitigation device 122 may be placed and/or positioned at a specific known location on and/or relative to wearable device 110. The position of error-mitigation device 122 may be represented as $$P_{T122} = \begin{bmatrix} x_{T122} \\ r_{T122} \\ z_{T122} \end{bmatrix}.$$

Much of the concepts and/or equations provided above in connection with the four-radar embodiment may also apply to this embodiment involving three radars and the built-in transponder. In some examples, error-mitigation device 122 may receive an oscillating signal from a signal generator 720. In one example, signal generator 720 may include and/or incorporate a transmitter and/or emitter. Additionally or alternatively, signal generator 720 may include and/or incorporate a receiver and/or sensor. Accordingly, signal generator 720 may, in some embodiments, amount to and/or constitute a transceiver.

In one example, signal generator 720 may be incorporated into and/or implemented by one of the radar devices (such as radar device 120(2)). In another example, signal generator 720 may be incorporated into and/or implemented by processing device 210 and/or additional circuitry within wearable device 110. Either way, the oscillating signal received from signal generator 720 may be delayed by a known time delay.

In one example, wearable device 110 may include and/or incorporate a fiber optic cable 730 that communicatively couples signal generator 720 and error-mitigation device 122 to one another. In this example, fiber optic cable 730 may impart a certain amount of delay to the oscillating signal as it traverses from signal generator 720 to error-mitigation device 122 and/or as it traverses back from error-mitigation device 122 to signal generator 720. For example, fiber optic cable 730 may cause and/or introduce a certain amount of delay per unit of length and/or distance. Because the distance between radar device 120(2) and error-mitigation device 122 is fixed and/or known, so too may be the length of fiber optic cable 730 within wearable device 110. As a result, processing device 210 may maintain and/or access a record and/or data entry that identifies the known delay imparted by fiber optic cable 730 on the oscillating signal.

In one example, processing device 210 may be able to determine and/or calculate the systematic distance error that affects the distance measurements obtained from radar devices 120(1)-(3) based at least in part on the oscillating signal and the known time delay. More specifically, processing device 210 may rely on and/or leverage the roundtrip time of this oscillating signal and its known delay, in conjunction with the roundtrip flight times of the three radar signals, to determine and/or calculate the systematic error. Upon determining and/or calculating the systematic error, processing device 210 may modify and/or correct these distance measurements and/or the transponder's position vector to compensate and/or account for the systematic error. For example, processing device 210 may subtract the value of the systematic error from the distance measurements obtained from the radar devices. In this example, processing device 210 may then triangulate the three-dimensional location of transponder 406(5) based at least in part on the corrected distance measurements.

In some examples, upon determining and/or calculating the three-dimensional position vector of transponder 406(5) relative to wearable device 110, processing device 210 may generate an input command for the corresponding artificial reality system based at least in part on that position vector. In one example, the input command may account for the relative three-dimensional location of transponder 406(5) and facilitate modifying at least one virtual component of artificial reality system 600 to account for that three-dimensional location. For example, processing device 210 may facilitate modifying at least one virtual component of the artificial reality system in accordance with the input command to account for the three-dimensional location of transponder 406(5).

Additionally or alternatively, upon determining the three-dimensional location of transponder 406(5) relative to wearable device 110, processing device 210 may generate an input command for artificial reality system 600 based at least in part on that three-dimensional location. In one example, the input command may account for the three-dimensional location of transponder 406(5) and facilitate modifying at least one virtual component of artificial reality system 600 to account for that three-dimensional location. For example, processing device 210 may facilitate modifying at least one virtual component of artificial reality system 600 in accordance with the input command to account for the three-dimensional location of transponder 406(5).

Processing device 210 may facilitate such modifications in a variety of different ways and contexts. For example, processing device 210 may send a message to the display within wearable device 110. Examples of this message include, without limitation, commands, computer-readable instructions, information and/or data indicative of the distance between the radar device and the transponder, information and/or data indicative of the three-dimensional location of the transponder relative to the wearable device, combinations or variations of one or more of the same, and/or any other suitable message.

Figure 8:
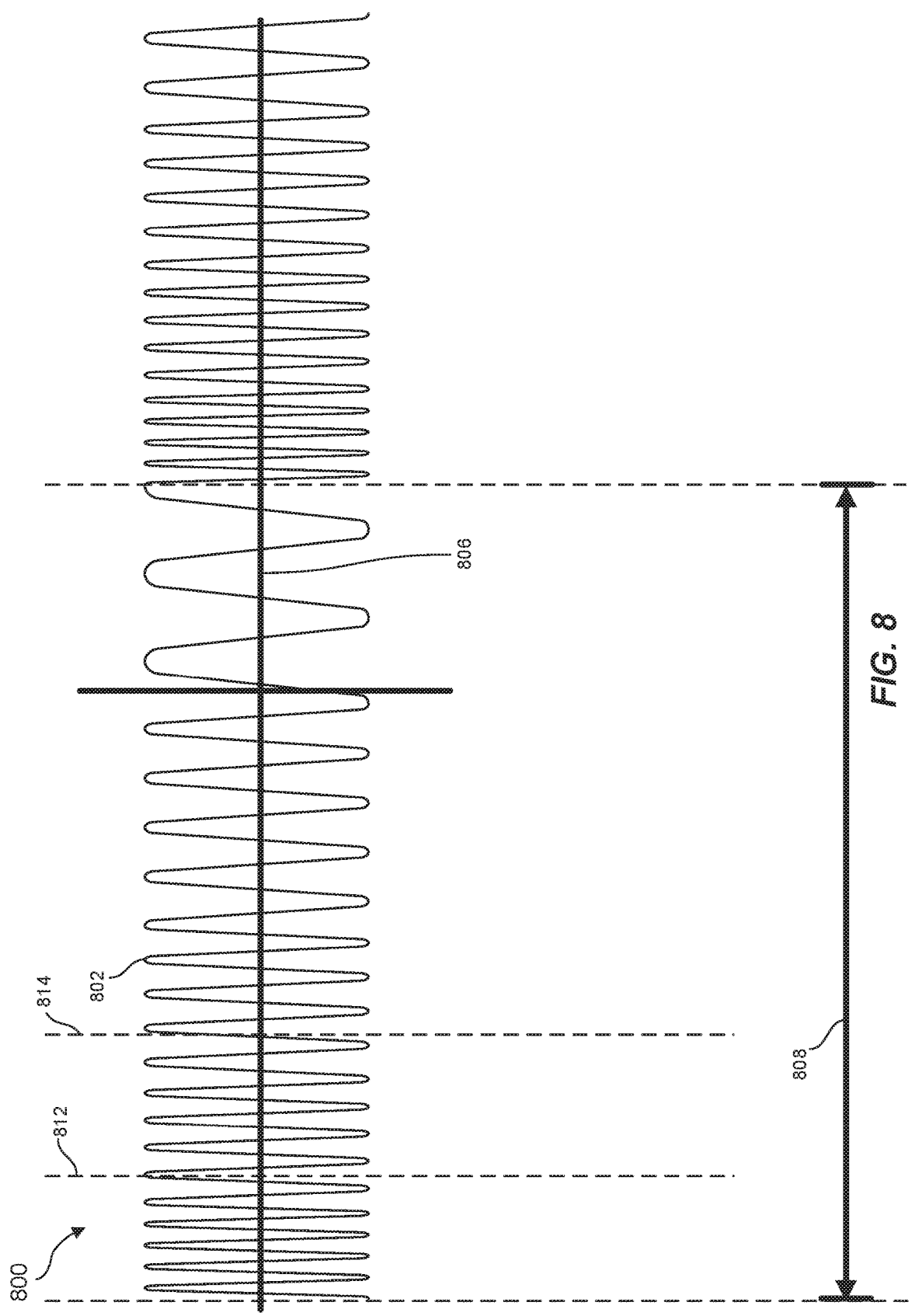
FIG. 8 is an illustration of an exemplary frequency-modulated radar signal used in connection with radar-based artificial reality tracking and/or triangulation.

FIG. 8 illustrates an exemplary frequency ramp 800 that represents and/or follows a frequency model that is ideally linear with time. As illustrated in FIG. 8, frequency ramp 800 may represent and/or involve a frequency-modulated radar signal 802 whose frequency ideally changes linearly with and/or over time 806. However, certain imperfections in the linearity of frequency modulated radar signal 802 may be inevitable and/or unavoidable. As explained above, such imperfections may lead to and/or result in systematic errors determined and/or suppressed by processing device 210. Although frequency ramp 800 in FIG. 8 is intended to demonstrate an exemplary frequency model, the frequency changes illustrated in FIG. 8 may not be accurately depicted to scale and/or time.

In frequency ramp 800, frequency-modulated radar signal 802 may sweep and/or ramp from 120 gigahertz to 130 gigahertz over a period 808. In one example, period 808 may represent and/or correspond to a 1-millisecond time interval. Accordingly, in this example, frequency ramp 800 may represent and/or amount to a linear 10-gigahertz per millisecond change and/or variation in radar signal 802.

In one example, processing device 210 may detect and/or calculate a beat frequency in connection with a returned signal that arrived at radar device 120(1) from transponder 406(1). For example, processing device 210 may determine that the returned signal arrived at a specific point in time with a frequency 812. In this example, processing device 210 may also determine that at that specific point in time the radar transmission emitted by radar device 120(1) to transponder 406(1) has a frequency 814. Processing device 210 may then calculate and/or determine beat frequency of the returned signal by identifying the absolute value of the difference between frequency 812 and frequency 814.

Three-dimensional mapping and/or tracking may be performed in a variety of different ways. In some examples, returning to FIG. 6, one of radar devices 120(1)-(3) may transmit a frequency-modulated radar signal to transponder 406(5). In response to this frequency-modulated radar signal from one of radar devices 120(1)-(3), transponder 406(5) may form a returned signal that is returned to one or more of radar devices 120(1)-(3). For example, returned signals 530(1)-(3) in FIG. 6 may all represent the same signal returned by transponder 406(5). In this example, processing device 210 may calculate the various distances between each of radar devices 120(1)-(3) and transponder 406(5) based at least in part on the frequencies of returned signals 530(1)-(3) as detected and/or received by radar devices 120(1)-(3), respectively, and data obtained from error-mitigation device 122. Additionally or alternatively, processing device 210 may determine the three-dimensional location of transponder 406(5) relative to wearable device 110 based at least in part on those various distances.

In other examples, processing device 210 may direct one of radar devices 120(1)-(3) to transmit a frequency-modulated radar signal to transponder 406(5). In response to the frequency-modulated radar signal received from one of radar devices 120(1)-(3), transponder 406(5) may form a returned signal that is returned to radar devices 120(1)-(3). For example, transponder 406(5) may form returned signals 530(1), 530(2), and 530(3) in FIG. 6 in response to the frequency-modulated radar signal received from radar device 120(1). In this example, processing device 210 may calculate the various distances between each of radar devices 120(1)-(3) and transponder 406(5) based at least in part on the frequencies of returned signals 530(1)-(3) as detected and/or received by radar devices 120(1)-(3), respectively, and data obtained from error-mitigation device 122. Additionally or alternatively, processing device 210 may determine the three-dimensional location of transponder 406(5) relative to wearable device 110 based at least in part on those various distances.

In some examples, the transponder may be secured to a wearable accessory worn by a specific body part of the user. In such examples, processing device 210 may detect and/or determine changes in position of that body part based at least in part on the distance between one or more of radar devices 120(1)-(3) and the transponder. Examples of such a body part of the user include, without limitation, a fingertip, a finger joint, a knuckle, a wrist, a shoulder, a palm, a back of hand, a foot, variations or combinations of one or more of the same, and/or any other suitable body part of the user.

In some examples, frequency ramp 800 may be produced and/or provided by a voltage-controlled oscillator, whose output frequency is proportional to the input voltage. In one example, the input voltage of the voltage-controlled oscillator may be ideally represented and/or characterized as $V_{VCO}(t)$, which is a nonlinear function. The output frequency of the voltage-controlled oscillator may be represented and/or characterized as $V_{VCOT}(t)=a_1 t+e(t)$ (where "$a_1$" corresponds to the slope of the signal and/or the change in frequency over time and "$e(t)$" corresponds to a frequency error away from an ideal frequency ramp). In this example, the frequency error "$e(t)$" originates and/or derives from imperfections in the voltage-controlled oscillator. Specifically, the imperfections in the voltage-controlled oscillator may lead to and/or introduce non-linearities in the output, resulting in the frequency error.

Figure 9:
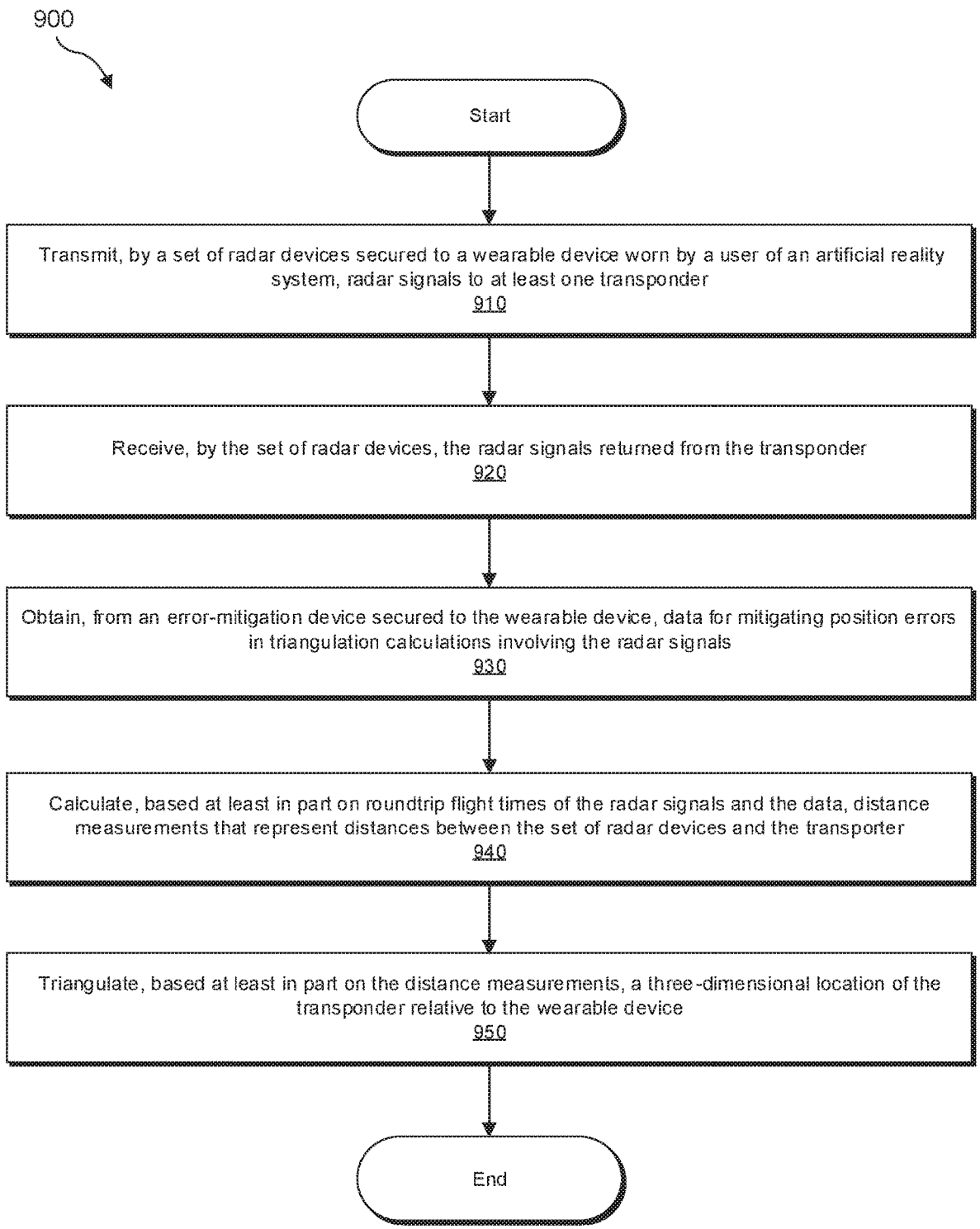
FIG. 9 is a flow diagram of an exemplary method for radar-based artificial reality tracking.

FIG. 9 is a flow diagram of an exemplary method 900 for mitigating systematic distance errors in radar-based triangulation calculations. The steps shown in FIG. 9 may be performed by certain devices incorporated into a wearable of an artificial reality system. Moreover, the steps shown in FIG. 9 may also incorporate and/or involve various substeps and/or variations consistent with the descriptions provided above in connection with FIGS. 1-8.

As illustrated in FIG. 9, at step 910, a set of radar devices secured to a wearable device worn by a user of artificial reality system may transmit radar signals to at least one transponder. For example, radar devices 120(1)-(3) of wearable device 110 may transmit frequency-modulated radar signal 520 to transponder 406(2) secured to wearable accessory 504(2) worn by a user of artificial reality system 1000 in FIG. 10. In this example, frequency-modulated radar signal 520 may be modulated according to a frequency model that is ideally linear with time.

At step 920 in FIG. 9, the set of radar devices may receive the radar signals returned from the transponder. For example, radar devices 120(1)-(3) may receive the radar signals returned from transponder 406(2) in response to frequency-modulated radar signal 520. In one example, returned signal 530 may represent and/or amount to an amplitude modulated version of frequency-modulated radar signal 520 achieved through modulation by a known frequency in the time-domain. In another example, returned signal 530 may simply be relayed and/or retransmitted by transponder 406(2) without any form of modulation.

At step 930 in FIG. 9, a processing device of the wearable device may obtain data from an error-mitigation device secured to the wearable device. For example, processing device 210 may obtain data from error-mitigation device 122. This data may enable processing device 210 to mitigate position errors in triangulation calculations involving the radar signals. In one example, this data may identify and/or be used to determine the roundtrip times of such radar signals.

At step 940 in FIG. 9, the processing device may calculate distance measurements that represent distances between the set of radar devices and the transponder based at least in part on roundtrip flight times of the radar signals and the data. For example, processing device 210 may determine and/or calculate distance measurements based at least in part on the roundtrip flight times of the radar signals of radar device 120(1)-(3) and the data obtained from error-mitigation device 122. In this example, as three distance measurements are normally needed to determine the three-dimensional localization of transponder 406(2), processing device 210 may be able to leverage the combination of the three radar-based distance measurements and the data obtained from error-mitigation device 122 to determine the amount of systematic error present in those distance measurements. Put another way, the radar devices and the error-mitigation device 122 may collectively generate and/or provide four equations to facilitate solving and/or determining only three unknowns. Processing device 210 may rely on and/or leverage this redundancy of information or data to mitigate, eliminate, and/or suppress any systematic errors in the radar-based distance measurements.

At step 950 in FIG. 9, the processing device of the wearable device may triangulate a three-dimensional location of the transponder relative to the wearable device based at least in part on the distance measurements. For example, processing device 210 may triangulate the three-dimensional location of transponder 406(2) relative to wearable device 110 based at least in part on the distance measurements that compensate and/or account for the systematic error. By compensating and/or accounting for the systematic error in this way, processing device 210 may be able to improve the accuracy and/or precision of the three-dimensional location of transponder 406(2).

As described above in connection with FIGS. 1-9, the disclosed radar systems may utilize various types of radar to track changes in the position, orientation, and/or physical location of a transponder in communication with a wearable artificial reality system. In some examples, the radars utilized by the disclosed radar systems may be sensitive to the distance and/or range of a transponder by measuring the roundtrip time of flight of Radio Frequency (RF) signals. Unfortunately, systematic errors may result from the zero-crossing of the continuous wave measurements made by the radars due to the radars' high sensitivity to small slope variations in their frequency ramps.

In these examples, the disclosed radar systems may rely on at least three measurement points to triangulate the three-dimensional position of the transponder. If a fourth measurement point is available, the disclosed radar systems may provide and/or access four equations to solve for only three unknowns. This superfluous information may enable the disclosed radar systems to mitigate and/or eliminate any systematic errors present in the continuous wave measurements.

The fourth measurement point may be provided and/or implemented in a variety of different ways and/or context. One option may be to utilize and/or implement at least four radars within a headset of an artificial reality system. In this option, the four radars may each measure the roundtrip time of flight of the corresponding RF signal sent to and/or returned from a transponder being targeted by the headset. As only three measurement points are needed to triangulate the three-dimensional location of the transponder, the headset may leverage the superfluous number of roundtrip flight times rendered by the four radars to determine the systematic error affecting the continuous wave measurements. The headset may then compensate and/or account for the systematic error in the triangulation calculation for the transponder.

Another option may be to utilize and/or implement an internal transponder, along with three radars, within a headset of an artificial reality system. In this option, the headset may include and/or incorporate a fixed delay mechanism (e.g., an optical fiber) that introduces a fixed delay into an RF signal travelling from one known location to the another on the headset. For example, an optical fiber may extend from the known location of a signal generator (e.g., one of the three radars) to the known location of the internal transponder. In this example, the fixed delay introduced by the optical fiber may be virtually noise-free and therefore ideal for subtracting systematic errors from continuous wave measurements. The three radars may each measure the roundtrip time of flight of the corresponding RF signal sent to and/or returned from an external transponder being targeted by the headset, and the internal transponder may be used to measure the transmission time of the RF signal travelling through the optical fiber. As only three measurement points are needed to triangulate the three-dimensional location of the transponder, the headset may leverage the transmission time of the optical fiber signal, in addition to the three roundtrip flight times rendered by the three radars, to determine the systematic error affecting the continuous wave measurements of the radars. The headset may then compensate and/or account for the systematic error in the triangulation calculation for the external transponder being targeted.

EXAMPLE EMBODIMENTS

Example 1: A radar system may include (1) a wearable device dimensioned to be worn by a user of an artificial reality system, (2) a set of radar devices secured to the wearable device, wherein in the set of radar devices (A) transmit radar signals to at least one transponder and (B) receive the radar signals returned from the transponder, (3)

an error-mitigation device secured to the wearable device, wherein the error-mitigation device provide data for mitigating position errors in triangulation calculations involving the radar signals, and (4) at least one processing device communicatively coupled to the set of radar devices and the error-mitigation device, wherein the processing device (A) calculates, based at least in part on roundtrip flight times of the radar signals and the data, distance measurements that represent distances between the set of radar devices and the transponder and (B) triangulates, based at least in part on the distance measurements, a three-dimensional location of the transponder relative to the wearable device.

Example 2: The radar system of Example 1, wherein (1) the set of radar devices may include (A) a first radar device, (B) a second radar device, and (C) a third radar device and (2) the error-mitigation device may include a fourth radar device that (A) transmits a radar signal to the transponder and (B) receives the radar signal returned from the transponder.

Example 3: The radar system of Example 2, wherein the processing device may calculate the distance measurements between the set of radar devices and the transponder based at least in part on (1) the roundtrip flight times of the radar signals and (2) a roundtrip flight time of the radar signal transmitted and received by the fourth radar device.

Example 4: The radar system of Example 1, wherein the error-mitigation device may include an additional transponder that receives, from a signal generator, an oscillating signal that is delayed by a known time delay.

Example 5: The radar system of Example 4, wherein the error-mitigation device may further include a fiber optic cable communicatively coupled between the additional transponder and the signal generator, wherein the fiber optic cable is tuned to delay the oscillating signal by the known time delay as the oscillating signal traverses from the signal generator to the additional transponder.

Example 6: The radar system of Example 4, wherein the processing device may (1) determine a systematic distance error that affects the distance measurements based at least in part on (A) the oscillating signal and (B) the known time delay, (2) correct the distance measurements by subtracting the system distance error from the distance measurements, and (3) triangulate the three-dimensional location of the transponder based at least in part on the corrected distance measurements.

Example 7: The radar system of Example 1, wherein the plurality of radar devices may be secured to the wearable device such that at least some of the radar devices are non-colinear with one another on the wearable device.

Example 8: The radar system of Example 1, wherein the plurality of radar devices may include (1) a first radar device that is situated, on the wearable device, proximate to a left ear of the user, (2) a second radar device that is situated, on the wearable device, proximate to a right ear of the user, and (3) a third radar device that is situated, on the wearable device, proximate to a top of the user's head.

Example 9: The radar system of Example 1, wherein (1) the transponder may be secured to a wearable accessory worn by a specific body part of the user and (2) the processing device may determine, based at least in part on the distance measurements, a change in position of the specific body part of the user.

Example 10: The radar system of Example 1, wherein (1) the transponder may modify the radar signal received from one of the radar devices by shifting the radar signal by a certain amount of frequency to enable the processing device to accurately measure the distance between the transponder and the radar device even when the transponder is located within a minimum distance threshold of the radar device, wherein the minimum distance threshold is outside a detection range of the radar device and (2) the processing device may compensate for the certain amount of frequency when calculating the distance between the transponder and the radar device.

Example 11: The radar system of Example 1, wherein (1) the set of the radar devices may generate the radar signals according to at least one frequency model that is linear what time and (2) the processing device may calculate the distance measurements by (A) determining beat frequencies of the radar signals, (B) multiplying the beat frequencies by a speed of light approximation, (C) identifying a frequency ramp of the frequency model, and (D) dividing products of the beat frequencies and the speed of light approximation by twice the frequency ramp of the frequency model.

Example 12: The radar system of Example 1, wherein the processing device may generate an input command for the artificial reality system that accounts for the distances between the set of radar devices and the transponder.

Example 13: The radar system of Example 1, wherein the processing device may facilitate modifying at least one virtual component of the artificial reality system in accordance with the input command to account for the distances between the set of radar devices and the transponder.

Example 14: An artificial reality system may include (1) a wearable device dimensioned to be worn by a user of an artificial reality system, (2) a set of radar devices secured to the wearable device, wherein the set of radar devices (A) transmit radar signals to at least one transponder and (B) receive the radar signals returned from the transponder, (3) an error-mitigation device secured to the wearable device, wherein the error-mitigation device provides data for mitigating position errors in triangulation calculations involving the radar signals, and (4) at least one processing device communicatively coupled to the set of radar devices and the error-mitigation device, wherein the processing device (A) calculates, based at least in part on roundtrip flight times of the radar signals and the data, distance measurements that represent distances between the set of radar devices and the transponder and (B) triangulates, based at least in part on the distance measurements.

Example 15: The artificial reality system of Example 14, wherein (1) the set of radar devices may include (A) a first radar device, (B) a second radar device, and (C) a third radar device and (2) the error-mitigation device may include a fourth radar device that (A) transmits a radar signal to the transponder and (B) receives the radar signal returned from the transponder.

Example 16: The artificial reality system of Example 15, wherein the processing device may calculate the distance measurements between the set of radar devices and the transponder based at least in part on (1) the roundtrip flight times of the radar signals and (2) a roundtrip flight time of the radar signal transmitted and received by the fourth radar device.

Example 17: The artificial reality system of Example 14, wherein the error-mitigation device may include and additional transponder that receives, from a signal generator, an oscillating signal that is delayed by a known time delay.

Example 18: The artificial reality system of Example 17, wherein the error-mitigation device may further include a fiber optic cable communicatively coupled between the additional transponder and the signal generator, wherein the fiber optic cable is tuned to delay the oscillating signal by the known time delay as the oscillating signal traverses from the signal generator to the additional transponder.

Example 19: The artificial reality system of Example 17, wherein the processing device may (1) determine a systematic distance error the affects the distance measurements based at least in part on (A) the oscillating signal and (B) the known time delay, (2) correct the distance measurements by subtracting the system distance error form the distance measurements, and (3) triangulate the three-dimensional location of the transponder based at least in part on the corrected distance measurements.

Example 20: A method may include (1) transmitting, by a set of radar devices secured to a wearable device worn by a user of an artificial reality system, radar signals to at least one transponder, (2) receiving, by the set of radar devices, the radar signals returned from the transponder, (3) obtaining, from an error-mitigation device secured to the wearable device, data for mitigating position errors in triangulation calculations involving the radar signals, (4) calculating, based at least in part on roundtrip flight times of the radar signals and the data, distance measurements that represent distances between the set of radar devices and the transponder, and (5) triangulating, based at least in part on the distance measurements, a three-dimensional location of the transponder relative the wearable device.

Embodiments of the present disclosure may include of be implemented in conjunction with various types of artificial-reality systems. Artificial reality is a form of reality that has been adjusted in some manner before presentation to a used, which may include, for example, a virtual reality, and augmented reality, a mixed reality, a hybrid reality, or some combination and/or derivative thereof. Artificial-reality content may include completely computer-generated content or computer-generated content combing with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer.) Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designated to work without near-eye displays (NEDs). Other artificial-reality systems may include an NED that also provides visibility into the real world (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one of more other users, and/or any other suitable external systems.

Figure 10:
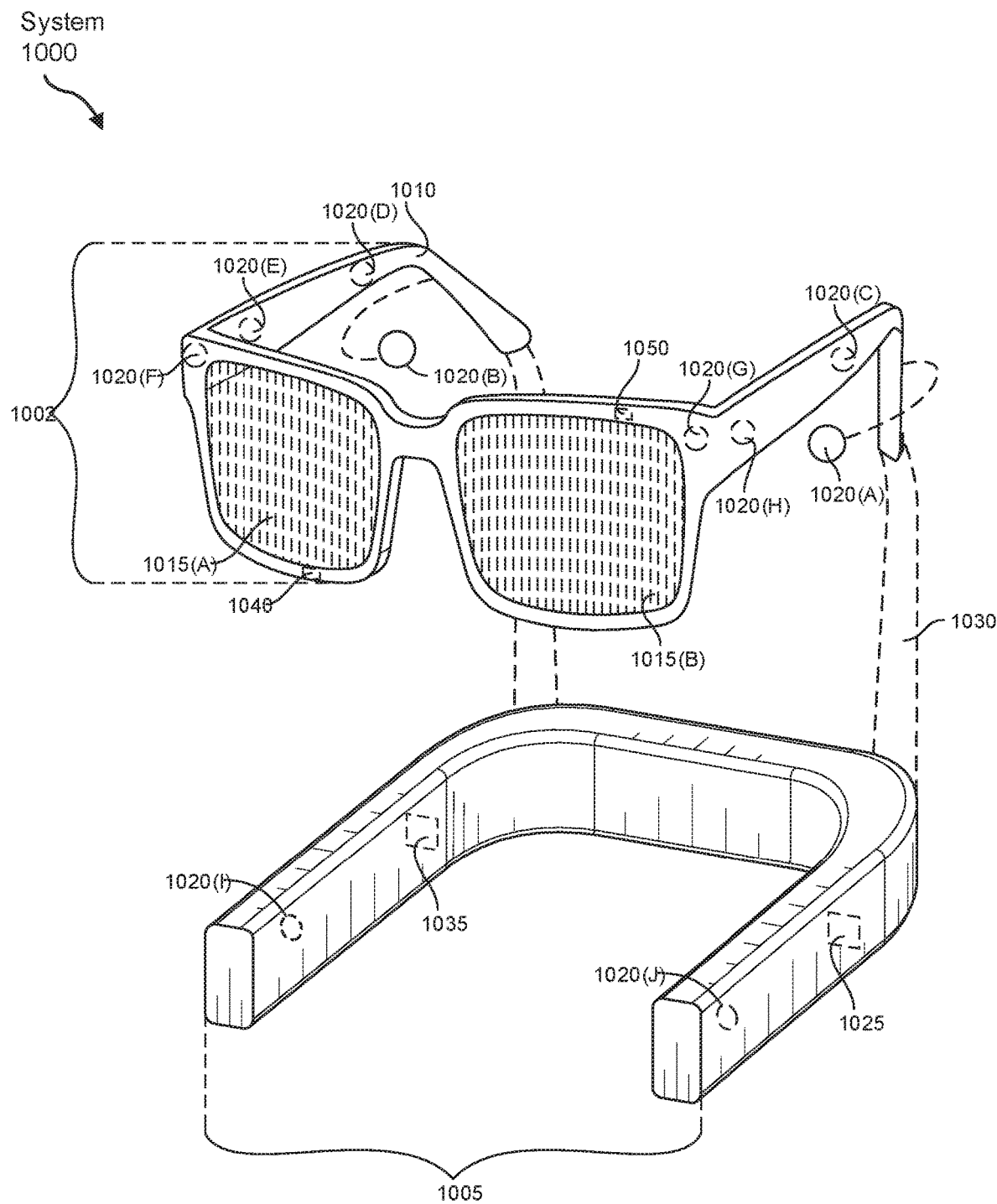
FIG. 10 is an illustration of exemplary augmented-reality glasses that may be used in connection with embodiments of this disclosure.
Figure 11:
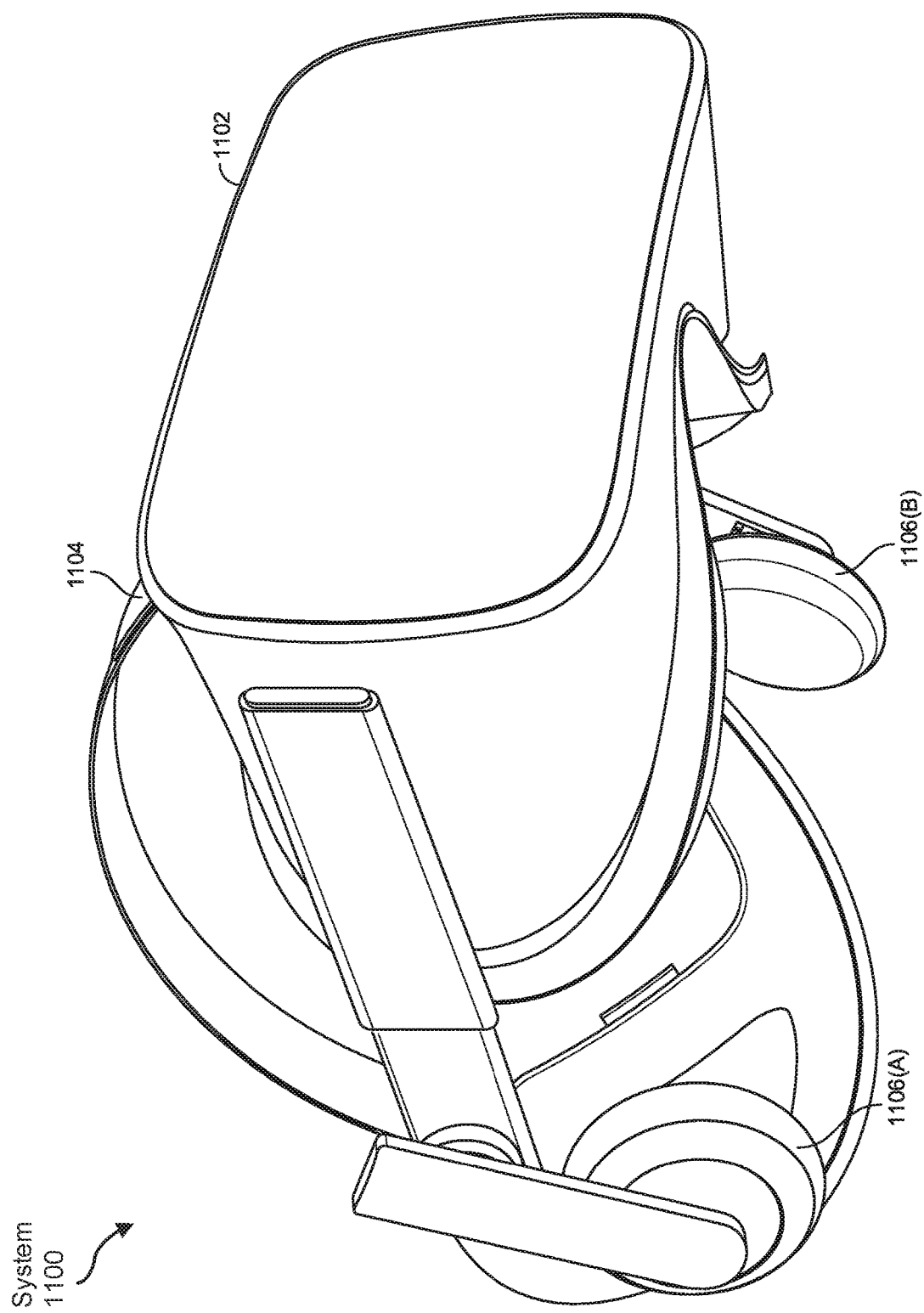
FIG. 11 is an illustration of an exemplary virtual-reality headset that may be used in connection with embodiments of this disclosure.

Turning to FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent one or more of a variety of different sensing mechanisms, such as position sensor, an inertial measurement unit (IMU), a depth camera assembly, a structured light emitter and/or detector, or any combination thereof. In some embodiments augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

In some examples, augmented-reality system 1000 may also include a microphone array with a plurality of acoustic transducers 1020(A)-1020(J), referred to collectively as acoustic transducers 1020. Acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 11 may include, for example, ten acoustic transducers: 1020(A) and 1020(B), which may be designated to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the positon of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of the user's head (e.g., as binaural microphones), augmented-reality device 1000 may stimulate binaural hearing and capture a 3D stereo sound field around about a user's head. In some embodiments, acoustic transducers 1020(A) and 1020(B) may be connected to augmented-reality system 1000 via a wired connection 1030, and in other embodiments acoustic transducers 1020(A) and 1020(B) may not be used at all in conjunction with augmented-reality system 1000.

Acoustic transducers 1020 on frame 1010 may be positioned in a variety of different ways, including along the length of the temples, across the bridge, above or below display devices 1015(A) and 1015(B), or some combination thereof. Acoustic transducers 1020 may also be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type of form of paired device. Thus, the following discussion of neckband 1005 may also apply to various other paired devices, such as charging cases, smart watches, smart phone, wrist bands, other wearable devices, hand-held controllers, tablet computers, laptop computers, other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater batter and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband may reduce weight and heat in eyewear device 1002, making it more comfortable to the user.

Power source 1035 in neckband 1005 may provide power to eyewear device 1002 and/or to neckband 1005. Power source may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system. such as virtual-reality system 1100 in FIG. 11, that mostly or completely covers a user's field of view. Virtual reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1000 and/or virtual-reality system 1100 may include one of more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to e.g., the viewer's eyes) light. These optical subsystems may be used in a non-pupil-forming architecture (such as a single lens configuration that directly collimates light but results in so-called pincushion distortion) and/or pupil-forming architecture (such as multi-lens configuration that produces so-called barrel distortion to nullify pincushion distortion).

In addition to or instead of using display screens, some of the artificial-reality systems describes herein may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements. etc. Artificial-reality systems may also be configured with any other suitable type of form of imagine projection system, such as retinal projectors used in virtual retina displays.

The artificial-reality systems describes herein may also include various types of computer vision components and subsystems. For example, augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LIDAR sensors, and/or any other suitable type or form of optical sensor. An artificial-reality system may process data from one or more of these sensors to identify a location of a user, to map the real world, to provide a user with context about real-world surroundings, and/or to perform a variety or other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear. gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays of 2D or 3D sonar sensors may also be used to determine a user's location within an environment. Augmented-reality and virtual-reality device (such as systems 1000 and 1100 of FIGS. 10 and 11, respectively) may incorporate and or all of these types of sensors to perform SLAM operations such as creating and continually updating maps of the user's current environment. In at least some of the embodiments described herein, SLAM data generated by there sensors may be referred to as "environmental data" and may indicate a user's current environment. This data may be stored in a local or remote data store (e.g., a cloud data store) and may be provided to a user's AR/VR device on demand.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is samples, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRFT), which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above method may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrive at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A wearable device comprising:
    at least one processing device;
    a set of radar devices configured to:
        transmit radar signals to at least one transponder that modifies the radar signals by shifting the radar signals by a certain amount of frequency to enable the processing device to accurately measure distances between the set of radar devices and the transponder even when the transponder is located within a minimum distance threshold of the set of radar devices, wherein the minimum distance threshold is outside a detection range of the set of radar devices; and
        receive the radar signals returned from the transponder; and
    an error-mitigation device configured to provide, to the processing device, data for mitigating position errors in triangulation calculations involving the radar signals.

2. The wearable device of claim 1, wherein the processing device is communicatively coupled to the set of radar devices and the error-mitigation device, wherein the processing device:
    calculates, based at least in part on roundtrip flight times of the radar signals and the data, distance measurements that represent the distances between the set of radar devices and the transponder; and
    triangulates, based at least in part on the distance measurements, a three-dimensional location of the transponder relative to the wearable device.

3. The wearable device of claim 2, wherein:
    the set of radar devices comprises:
        a first radar device;
        a second radar device; and
        a third radar device; and
    the error-mitigation device comprises a fourth radar device that:
        transmits a radar signal to the transponder; and
        receives the radar signal returned from the transponder.

4. The wearable device of claim 3, wherein the processing device calculates the distance measurements between the set of radar devices and the transponder based at least in part on:
    the roundtrip flight times of the radar signals; and
    a roundtrip flight time of the radar signal transmitted and received by the fourth radar device.

5. The wearable device of claim 2, wherein the error-mitigation device comprises an additional transponder that receives, from a signal generator, an oscillating signal that is delayed by a known time delay.

6. The wearable device of claim 5, wherein the error-mitigation device further comprises a fiber optic cable communicatively coupled between the additional transponder and the signal generator, wherein the fiber optic cable is tuned to delay the oscillating signal by the known time delay as the oscillating signal traverses from the signal generator to the additional transponder.

7. The wearable device of claim 5, wherein the processing device:
    determining a systematic distance error that affects the distance measurements based at least in part on:
        the oscillating signal; and
        the known time delay;
    correcting the distance measurements by subtracting the system distance error from the distance measurements; and
    triangulating the three-dimensional location of the transponder based at least in part on the corrected distance measurements.

8. The wearable device of claim 2, wherein the set of radar devices are secured to the wearable device such that at least some of the radar devices are non-colinear with one another on the wearable device.

9. The wearable device of claim 2, wherein the set of radar devices comprise:
    a first radar device that is situated, on the wearable device, proximate to a left ear of a user;
    a second radar device that is situated, on the wearable device, proximate to a right ear of the user; and
    a third radar device that is situated, on the wearable device, proximate to a top of the user's head.

10. The wearable device of claim 2, wherein:
    the transponder is secured to a wearable accessory worn by a specific body part of the user; and
    the processing device determines, based at least in part on the distance measurements, a change in position of the specific body part of the user.

11. The wearable device of claim 2, wherein:
    the processing device compensates for the certain amount of frequency when calculating the distances between the transponder and the radar devices.

12. The wearable device of claim 2, wherein:
    the set of radar devices generate the radar signals according to at least one frequency model that is linear with time; and
    the processing device calculates the distance measurements by:
        determining beat frequencies of the radar signals; and
        multiplying the beat frequencies by a range conversion factor.

13. The wearable device of claim 2, wherein the processing device generates an input command for an artificial reality system that accounts for the distances between the set of radar devices and the transponder.

14. The wearable device of claim 13, wherein the processing device facilitates modifying at least one virtual component of the artificial reality system in accordance with the input command to account for the distances between the set of radar devices and the transponder.

15. An artificial reality system comprising:
- a wearable device dimensioned to be worn by a user;
- at least one processing device;
- a set of radar devices secured to the wearable device, wherein the set of radar devices:
  - transmit radar signals to at least one transponder that modifies the radar signals by shifting the radar signals by a certain amount of frequency to enable the processing device to accurately measure distances between the set of radar devices and the transponder even when the transponder is located within a minimum distance threshold of the set of radar devices, wherein the minimum distance threshold is outside a detection range of the set of radar devices; and
  - receive the radar signals returned from the transponder;
- an error-mitigation device secured to the wearable device, wherein the error-mitigation device provides, to the processing device, data for mitigating position errors in triangulation calculations involving the radar signals; and
- wherein the processing device:
  - calculates, based at least in part on roundtrip flight times of the radar signals and the data, distance measurements that represent distances between the set of radar devices and the transponder; and
  - triangulates, based at least in part on the distance measurements, a three-dimensional location of the transponder relative to the wearable device.

16. The artificial reality system of claim 15, wherein:
the set of radar devices comprises:
- a first radar device;
- a second radar device; and
- a third radar device; and the error-mitigation device comprises a fourth radar device that:
- transmits a radar signal to the transponder; and
- receives the radar signal returned from the transponder.

17. The artificial reality system of claim 16, wherein the processing device calculates the distance measurements between the set of radar devices and the transponder based at least in part on:
- the roundtrip flight times of the radar signals; and
- a roundtrip flight time of the radar signal transmitted and received by the fourth radar device.

18. The artificial reality system of claim 15, wherein the error-mitigation device comprises an additional transponder that receives, from a signal generator, an oscillating signal that is delayed by a known time delay.

19. The artificial reality system of claim 18, wherein the error-mitigation device further comprises a fiber optic cable communicatively coupled between the additional transponder and the signal generator, wherein the fiber optic cable is tuned to delay the oscillating signal by the known time delay as the oscillating signal traverses from the signal generator to the additional transponder.

20. A method comprising:
- transmitting, by a set of radar devices secured to a wearable device worn by a user of an artificial reality system, radar signals to at least one transponder that modifies the radar signals by shifting the radar signals by a certain amount of frequency to enable at least one processing device to accurately measure distances between the set of radar devices and the transponder even when the transponder is located within a minimum distance threshold of the set of radar devices, wherein the minimum distance threshold is outside a detection range of the set of radar devices;
- receiving, by the set of radar devices, the radar signals returned from the transponder;
- obtaining, by the processing device from an error-mitigation device secured to the wearable device, data for mitigating position errors in triangulation calculations involving the radar signals;
- calculating, by the processing device based at least in part on roundtrip flight times of the radar signals and the data, distance measurements that represent distances between the set of radar devices and the transponder; and
- triangulating, by the processing device based at least in part on the distance measurements, a three-dimensional location of the transponder relative to the wearable device.

* * * * *